United States Patent
Rauner

(10) Patent No.: US 9,867,023 B2
(45) Date of Patent: Jan. 9, 2018

(54) EMERGENCY MESSAGING SYSTEM AND METHOD OF RESPONDING TO AN EMERGENCY

(71) Applicant: SIRENGPS LLC, St. Louis, MO (US)

(72) Inventor: Paul A. Rauner, St. Louis, MO (US)

(73) Assignee: SirenGPS, LLC, St. Louis, MO (US)

( * ) Notice: Subject to any disclaimer, the term of this patent is extended or adjusted under 35 U.S.C. 154(b) by 7 days.

(21) Appl. No.: 14/369,147

(22) PCT Filed: Nov. 9, 2012

(86) PCT No.: PCT/US2012/064514
§ 371 (c)(1),
(2) Date: Jun. 26, 2014

(87) PCT Pub. No.: WO2013/071157
PCT Pub. Date: May 16, 2013

(65) Prior Publication Data
US 2014/0364081 A1    Dec. 11, 2014

Related U.S. Application Data

(60) Provisional application No. 61/558,301, filed on Nov. 10, 2011, provisional application No. 61/558,312, (Continued)

(51) Int. Cl.
*H04M 11/04* (2006.01)
*H04W 4/22* (2009.01)
(Continued)

(52) U.S. Cl.
CPC ............ *H04W 4/22* (2013.01); *G08B 25/002* (2013.01); *G08B 25/006* (2013.01);
(Continued)

(58) Field of Classification Search
CPC ....................................................... H04W 4/22
(Continued)

(56) References Cited

U.S. PATENT DOCUMENTS

2001/0056435 A1 * 12/2001 Quick .................... G06Q 40/08
2004/0142678 A1     7/2004 Krasner
(Continued)

FOREIGN PATENT DOCUMENTS

KR    10-0560875 B1    3/2006

OTHER PUBLICATIONS

International Search Report, International Application No. PCT/US2012/064514, dated Mar. 13, 2013, 2 pages.

*Primary Examiner* — Joel Ajayi
(74) *Attorney, Agent, or Firm* — CreatiVenture Law, LLC; Dennis JM Donahue, III

(57) ABSTRACT

Various embodiments concern method of providing emergency messaging service to one or more users of one or mobile electrical devices. The method can include: using a first mobile electrical device to send a emergency trigger message, using the first mobile electrical device to send a emergency trigger message can include: receiving a location of the first mobile electrical device from a global positioning module, the global positioning module miming on the first mobile electrical device; receiving a first trigger message from a user of the first electrical device; and wirelessly transmitting the first trigger message and the location of the first mobile electrical device to a emergency response module running on at least one second processor of a first server; receiving the first emergency trigger message in emergency response module; determining a first emergency response unit associated with the first location of the first mobile electrical device; and transmitting the first emergency trigger message to the first emergency response unit associated (Continued)

with the location of the first mobile electrical device. Other embodiments are disclosed.

45 Claims, 18 Drawing Sheets

Related U.S. Application Data filed on Nov. 10, 2011, provisional application No. 61/594,648, filed on Feb. 3, 2012.

(51) Int. Cl.
*G08B 25/00* (2006.01)
*G08B 25/01* (2006.01)
*G08B 27/00* (2006.01)
*H04L 12/18* (2006.01)

(52) U.S. Cl.
CPC ......... *G08B 25/016* (2013.01); *G08B 27/001* (2013.01); *H04L 12/1895* (2013.01)

(58) Field of Classification Search
USPC .......................................... 455/404.1, 404.2
See application file for complete search history.

(56) References Cited

U.S. PATENT DOCUMENTS

| | | |
|---|---|---|
| 2006/0040639 A1 | 2/2006 | Karl |
| 2007/0072583 A1* | 3/2007 | Barbeau ............ H04M 3/42348 455/404.2 |
| 2010/0003946 A1 | 1/2010 | Ray et al. |
| 2010/0003954 A1 | 1/2010 | Greene et al. |
| 2011/0227730 A1 | 9/2011 | Stevenson |
| 2012/0282887 A1 | 11/2012 | Khoo et al. |

\* cited by examiner

FIG. 10

USER COMMUNICATION ⸻ 841

10 OCT 11 10:32AM
USERA(202)555-1212 USERA@SUBSCRIBER.EDU

A fire alarm is going off in C.Hall, is this for real?

10 OCT 11 10:36AM
USERB(202)555-1212 USERB@SUBSCRIBER.EDU

Have received your instructions regarding the fire drill. Doors are closed and we are in C. Lawn. Waiting for all clear from the fire department.

10 OCT 11 10:37AM
USERA(202)555-1212 USERA@SUBSCRIBER.EDU

Sorry, got instructions from our RM and we are evacuating as requested

10 OCT 11 10:37AM
USERB(202)555-1212 USERB@SUBSCRIBER.EDU

Fire department has given the clear to return to C. Hall after successful drill and all clear.

CAMPUS INTERFACE ⸻ 842

LOCATIONS

31 Administration Bldg
22 Admission
33 A. Hall
01 A. Court
24 Alumni Memorial Hall
18 Alumni Relations
34 Intramural Field
03 Athletic Practice
40 Athletic Office
39 B. Center
19 Bookstore
35 Campus Building
17 Center for the Arts
22 Government Learning Center
28 Computer Center
41 College Relations
14 C. Hall
42 Development Office
09 professional Center
29 Masters Hall
08 Health & Counseling Center
06 Residential Learning
27 Chapel

C. HALL USERS ⸻ 1249       [CANCEL]

MESSAGE LIST
EXPORT LIST
PRINT LIST

USER A: USER NAME - USER PHONE - USER EMERGENCY CONTACT
USER B: USER NAME - USER PHONE - USER EMERGENCY CONTACT
USER C: USER NAME - USER PHONE - USER EMERGENCY CONTACT
USER D: USER NAME - USER PHONE - USER EMERGENCY CONTACT
USER E: USER NAME - USER PHONE - USER EMERGENCY CONTACT
USER F: USER NAME - USER PHONE - USER EMERGENCY CONTACT
USER G: USER NAME - USER PHONE - USER EMERGENCY CONTACT
USER H: USER NAME - USER PHONE - USER EMERGENCY CONTACT
USER I: USER NAME - USER PHONE - USER EMERGENCY CONTACT
USER J: USER NAME - USER PHONE - USER EMERGENCY CONTACT
USER K: USER NAME - USER PHONE - USER EMERGENCY CONTACT
USER L: USER NAME - USER PHONE - USER EMERGENCY CONTACT
USER M: USER NAME - USER PHONE - USER EMERGENCY CONTACT
USER N: USER NAME - USER PHONE - USER EMERGENCY CONTACT

FIG. 12

EMERGENCY MESSAGING SYSTEM AND METHOD OF RESPONDING TO AN EMERGENCY

CROSS-REFERENCE TO RELATED APPLICATIONS

This application claims the benefit of U.S. Provisional Application No. 61/558,312, filed Nov. 10, 2011, U.S. Provisional Application No. 61/558,301, filed Nov. 10, 2011, and U.S. Provisional Application 61/594,648, filed Feb. 3, 2012. U.S. Provisional Application No. 61/558,312, U.S. Provisional Application No. 61/558,301, and U.S. Provisional Application 61/594,648 are incorporated herein by reference.

FIELD OF THE INVENTION

This invention relates generally to emergency response services (EMS) systems and methods, and relates more particularly to EMS computer systems and methods of responding to an emergency.

DESCRIPTION OF THE BACKGROUND

Telecommunication services, particularly remote computing devices, are essential public safety tools. During emergencies, remote computing devices are indispensable for contacting the appropriate response units (e.g., police or fire) or authorities, and for distributing of emergency messages. Accordingly, a need or potential for benefit exists for an improved emergency messaging system.

BRIEF DESCRIPTION OF THE DRAWINGS

To facilitate further description of the embodiments, the following drawings are provided in which:

FIG. 8-14 illustrates exemplary examples of map interfaces of the computer system of FIG. 1, according to the first embodiment;

Figure 1:
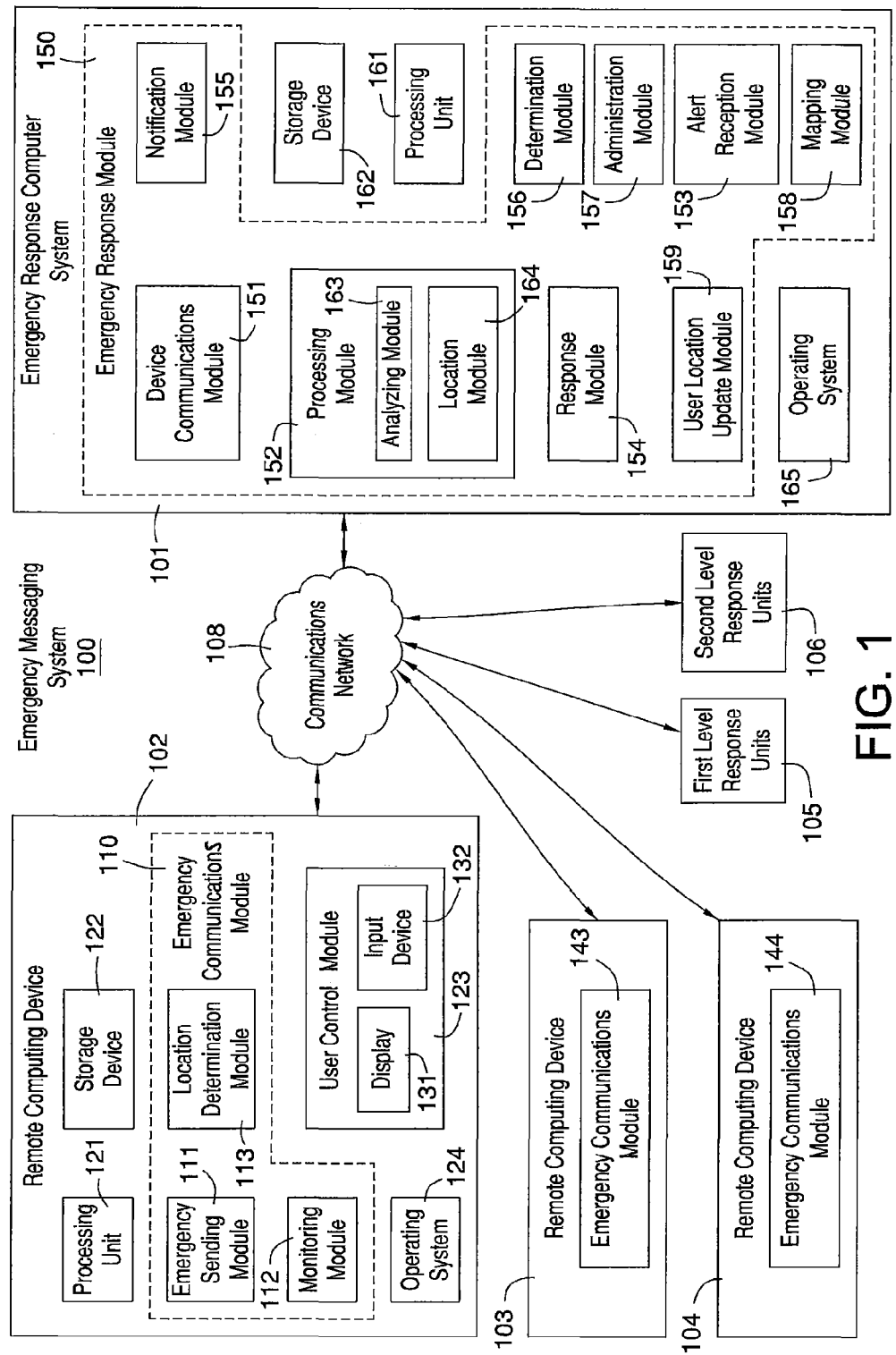
FIG. 1 illustrates a block diagram of an emergency messaging system, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

DETAILED DESCRIPTION OF EXAMPLES OF EMBODIMENTS

Some embodiments teach a method of responding to an emergency using an emergency response computer system. The emergency response computer system having a processing unit and an emergency response module. The method including: receiving in the emergency response module one or more emergency trigger messages from one or more remote computing devices, the emergency response module running on the processing unit; using the emergency response module to process the one or more emergency trigger messages to determine an emergency level, using the emergency response module to process the one or more emergency trigger messages including: determining locations of at least a portion of the one or more remote computing devices; analyzing the one or more emergency trigger messages to determine a content of the one or more emergency trigger messages; determining a level of response to the one or more emergency trigger messages based upon the locations of the at least the portion of the one or more remote computing devices and the content of the one or more emergency trigger messages, the levels of response comprise a first level response and a second level response; using the locations of the at least the portion of the one or more remote computing devices to determine a first response unit to notify; using the locations of the at least the portion of the one or more remote computing devices to determine a second response unit to notify if the level of response is the second level of response; using the emergency response module to notify the first response unit if the level of response is the first level of response or the second level of response; using the emergency response module to notify the second level response unit if the level of response is the second level of response; receiving in the emergency response module instructions from the second level response unit to notify a target group if the level of response is the second level of response; and using the emergency response module to send a first emergency alert message to the target group if the level of response is the second level of response.

Further embodiments concern a method of responding to an emergency using a mobile electrical device. The mobile electrical device can have a first processor and an emergency module. The method can include: receiving a first emergency trigger message in the emergency module from a user of the mobile electrical device, the emergency module running on the first processor; sending a second emergency trigger message to an emergency response computer system using the emergency module; sending location information to the emergency response computer system using the emergency module; receiving in the emergency module a request for updated location information from the emergency response computer system; sending updated location information to the emergency response computing system using the emergency module; and receiving in the emergency module a mass emergency message from the emergency response computer system.

In other embodiments, an emergency messaging system can be configured to be used with three or more first electrical devices. The emergency messaging system can include: (a) a device communications module configured to run on a first processor and further configured to communicate with two or more sending electrical devices, the device communications module further configured to receive two or more emergency trigger messages from one or more users via the two or more sending electrical devices; (b) a processing module configured to run on the first processor and further configured to process the two or more emergency trigger messages to determine an emergency level, the processing module can have: (1) a location module configured to determine a location of at least a first portion of the three or more first electrical devices; (2) an analyzing module configured to analyze the two or more emergency trigger messages to determine a content of the two or more emergency trigger messages; (3) a response module configured to determine a level of response to the two or more emergency trigger messages based upon a location of the two or more sending electrical devices and the content of the two or more emergency trigger messages, the levels of response comprise a first level response and a second level response; (4) a determination module configured to use the location of at least a second portion of the two or more sending electrical devices to determine an appropriate first response unit to notify and an appropriate second response unit to notify; and (5) a notification module configured to run on the first processor and further configured to notify the appropriate first response unit and the appropriate second level response unit. In some examples, the three or more first electrical devices comprise the two or more sending electrical devices.

Various embodiments can concern method of providing messaging service to one or more users of one or mobile electrical devices. The method can include: facilitating a use of a first mobile electrical device to send a first trigger message, facilitating the use of the first mobile electrical device to send the first trigger message can include: receiving a location of the first mobile electrical device from a global positioning module, the global positioning module running on the first mobile electrical device; receiving a first trigger message from a user of the first electrical device; and wirelessly transmitting the first trigger message and the location of the first mobile electrical device to a response module running on at least one second processor of a first server; receiving the first trigger message in response module; determining a first response unit associated with the first location of the first mobile electrical device; and transmitting the first trigger message to the first response unit associated with the location of the first mobile electrical device. The one or more users of the one or more mobile electrical device comprise the first user. The one or more mobile electrical device comprises the first mobile electrical device.

Still other embodiments can concern an emergency messaging system configured to be used with the two or more mobile electrical devices. The emergency messaging system can include: a device communications module configured to run on at least one first processor and further configured to communicate with the two or more mobile electrical devices, the device communications module further configured to receive a first emergency trigger message from a user of a first one of the two or more mobile electrical devices, the first trigger message comprises a location of the first one of the two or more mobile electrical devices; a determination module configured to run on the at least one first processor and further configured to use the location of the first one of the two or more mobile electrical devices to determine an appropriate emergency response unit to notify; and a notification module configured to run on the at least one first processor and further configured to notify the appropriate emergency response unit of the first trigger message.

Various embodiments concern a method for emergency messaging to a target group where the target group comprises two or more users. The method can include: receiving from the two or more using information regarding a portable communication device from each of the two or more users; storing in one or more databases a profile for the portable communication devices associated with each of the two or more users; selecting a geographic area for emergency messaging; receiving current location information from at least a first user of the two or more users; processing the current location information to identify one or more affected devices, the one or more affected devices comprise the portable communication devices of the two or more users within a selected geographic area; and transmitting an emergency message to the one or more affected devices to alert users of the one or more affected devices to an emergency in the selected geographic area.

In some embodiments, a method for emergency messaging to a target group based in part on current location information derived from portable communication devices associated with individuals of the target group is provided. The method can include: receiving from the two or more using information regarding a portable communication device from each of the two or more users; storing in one or more databases a profile for the portable communication devices associated with each of the two or more users; selecting a geographic area for emergency messaging; receiving current location information from the portable communication devices, and communicating the current location information to the emergency messaging services system; and evaluating the current location information and opening one-way and/or two-way emergency messaging communication between the emergency messaging services system and the portable communication devices within the selected geographic area.

Various embodiments can concern a system for emergency messaging to a target group based in part on current location information derived from portable communication devices associated with individuals of the target group. The system generally can include: an emergency response computer system having an emergency response module. The emergency response module is configured to evaluate current location information derived from portable communication devices associated with individuals of the target group and open one-way and/or two-way emergency messaging communication between the emergency response computer system and the portable communication devices identified as within a selected geographic area; and one or more databases for storing profiles for a portable communication device associated with each individual of a target group, wherein the one or more databases is in communication with the emergency response module.

Various embodiment concern a method for emergency messaging to a target group. The target group comprises two or more users. The method can include receiving from the two or more users information regarding a portable communication device from each of the two or more users; storing in one or more databases a profile for the portable communication devices associated with each of the two or more users; selecting a first geographic area for emergency messaging; receiving current location information from at least a first user of the two or more users; processing the current location information to identify one or more affected devices, the one or more affect devices comprise the portable communication devices of the two or more users that are within the first geographic area; and transmitting an emergency message to the one or more affected devices to alert users of the one or more affected devices to an emergency in the first geographic area.

In many embodiments, an emergency response module interfaces with a remote computing device that will call a specified emergency responder based on the caller's location. The outgoing call can be customized to connect to the appropriate emergency service. For travelers in foreign countries, the embodiment can give the option to connect with English speaking emergency assistance. In addition, the subscriber can receive immediate notification of the caller's location and contact information to enhance response capability and reporting.

Some embodiments can be considered to be an advisory distribution service which sends information about dangerous weather, crime and political unrest to people in the affected location, and people with plans to travel there, simultaneously reporting to the subscriber on affected members of the community. Sources of advisory information would include, but not be limited to: US State Department, National Weather Service, European Weather, Centers for Disease Control (CDC), Transportation Security Administration (TSA), and third party providers.

Numerous embodiments concern an emergency communications module with a remote computing device that directs communication to the appropriate service providers for travel, medical care, ticket sales, social, and other services. The emergency communications module recognizes different users and connects to the correct provider, allowing different providers for different population segments and/or for calls made from different locations.

The same or different embodiments concern an emergency communications module with a remote computing device that provides directory based text or instant messaging based on a tiered system that controls access and group messaging through assigned tier groups. Messaging is permission-based by tier and has built-in abuse controls that can be customized. The emergency communications module with a remote computing device allows groups built to simplify communication for classes, clubs and committees, while safeguards keep group messaging from becoming a problem. Top down hierarchy allows management tier users to message any individual, group of users, or the entire community, while rank and file users have limited access to group and individual messaging.

Another aspect of the embodiments relates to an interface with a remote computing device to provide a virtual tour guide on the device that will allow users to take a tour complete with directions, instructions and tour explanations. The interface with a remote computing device will also provide directions to anywhere on subscriber's campus from a user's current location. The interface with a remote computing device can be loaded with user profile information to provide directions to get to classes or meetings.

Another aspect of the disclosure relates to an interface with a remote computing device which places advertising, news or other print and/or video content onto the interface with a remote computing device. Advertising/messaging can be triggered by user location, and the database can record "views" by users.

Turning to the drawings, FIG. 1 illustrates block diagram of an emergency messaging system 100, according to a first embodiment. Emergency messaging system 100 is merely exemplary and is not limited to the embodiments presented herein. Emergency messaging system 100 can be employed in many different embodiments or examples not specifically depicted or described herein.

Emergency messaging system 100 can provide emergency voice and/or messaging services in many different services (e.g., text, email, voice, text to voice, etc.). Generally, emergency response services can be established with a target group of individuals within a selected geographic area. In certain embodiments, emergency messaging system 100 can be provided to a target group based in part on current location information derived from remote computing devices associated with individuals of the target group. The target group may be all individuals physically located within a specific geographic location (e.g., a zip code, a city, a county, a state, a university or college campus, work location, office building, airport, public space, or a region served by a specific emergency response group), all individuals registered to be located at a specific geographic location (e.g., all students, faculty, staff, etc. at a university or college campus; all workers at a work location or office building; all users of a public space, all residents of a region, all people with a cell phone having a particular area code), all individuals purchasing admission to a designated event, etc.

Emergency messaging system 100 can provide one-way and/or two-way communication between users, administrators of emergency messaging system 100, and emergency response units. In certain aspects, emergency messaging system 100 can receive communications of users and record, log, and/or otherwise utilize these communications to manage a potential emergency situation. Emergency trigger messages from users can be received via phone, email, text, text to voice, etc. The message may be received through a specialized application on the user's remote computing device, or can be provided by emergency services to the subscriber administrator. Once an emergency message is received from a user, the message may be populated into databases of emergency messaging system 100, and the message can be analyzed for a potential emergency situation.

By way of non-limiting example, message receipt and processing can occur as follows: a user activates an emergency communication module on a remote computing device and provides a text, voice-based emergency message, and/or email or phone message; an emergency communications module obtains location information for the user and sends message content and location information; an emergency response module receives a "911 call initiated notice message" that can include: unique user ID, user name from profile, user location, time, date, call path, time to process call; the 911 call initiated notice message is transmitted to a system administrator contact; the 911 call initiated notice message is recorded into an event log; the emergency response module notes the message time to a mass event timer for an event time check; the emergency response module populates the message to database(s) for analysis of a potential emergency situation. The emergency message can also be forwarded to the appropriate emergency response unit.

In certain aspects, the emergency response module also tracks and logs the time required to deliver messages, delivery confirmations and interval, as well as delivery system used. The emergency response module also can send a delivery report with this information to the emergency message log, and send it via email to the response unit's email designated for delivery of emergency messages. The emergency response module also can send a copy of the report to the system administrator.

Referring to FIG. 1, in some embodiments, emergency messaging system 100 (i.e., an messaging system) can include: (a) a response computer system 101; (b) two or more remote computing devices 102, 103, and 104; (c) one or more first level response units 105; and (d) one or more second level response units 106. In some examples, response computer system 101, remote computing devices 102, 103, and 104, first level response units 105, and second level response units 106 can be configured to communicate using communications network 108.

In the same or different embodiments, emergency messaging system 100 can include: (a) an emergency response module 150 (i.e., a response module) configured to run on processing unit 161 of emergency response computer system 101; (b) an emergency communications module 110 configured to run on processing unit 121 of remote computing device 102; (c) an emergency communications module 143 configured to run on a processing unit of remote computing device 103; and (d) an emergency communications module 144 configured to run on a processing unit of remote computing device 104.

Emergency response computer system 101 can include: (a) at least one processing unit 161; (b) emergency response module 150 configured to run on processing unit 161; (c) a storage device 162; and (d) an operating system 165 configured to run on processing unit 161. In many embodiments, emergency response module 150 can include: (a) a device communications module 151; (b) a processing module 152; (c) an alert reception module 153; (d) a response module 154; (e) a notification module 155; (f) a determination module 156; (g) an administration module 157; and (h) a user location update module 159.

In some examples, remote computing devices 102, 103, and 104 can be smart devices configured to execute one or more software programs. For example, each of remote computing devices 102, 103, and 104 can be an iPhone® or iPad® device manufactured by Apple Computers, Inc. of Cupertino, Calif., a Blackberry® device, manufactured or licensed by Research in Motion Limited, or a smart device running the Android™ operating system of Google, Inc., and/or a Palm® device manufactured or licensed by Palm, Inc.

Remote computing device 102 can include: (a) at least one processing unit 121; (b) emergency communications module 110 configured to run on processing unit 121; (c) a storage device 122; (d) an operating system 124 configured to run on processing unit 121; and (e) a user control module 123. In various embodiments, emergency communications module 110 can include: (a) an emergency sending module 111; (b) a monitoring system 112; and (c) a location determination module 113. In some examples, emergency communications modules 143 and 144 can be similar or identical to emergency communications module 110. In the same or different embodiment, remote computing devices 103 and 104 can be similar or identical to remote computing device 102.

First level response units 105 can be emergency response unit(s). First level response units 105 can include local police departments, fire departments, ambulance services, and local emergency response teams. For example, on a university campus, first level response units 105 can be the university police department.

Second level response units 106 can be one or more people or groups that are responsible for making decisions regarding distribution of information about an emergency. Second level response units 106 can include local or state government officials, local police or fire chiefs, local and state government disaster agencies, or other officials. For example, on a university campus, second level response units 106 can include the chief of the university police department, the university president, and/or other members of the administration of the university. In some examples, response computer system 101 can store lists of the appropriate first and second level response units for predetermined areas in storage device 162.

Communications network 108 can be a combination of wired and wireless networks. For example, communications network 108 can include the Internet, local wireless or wired computer networks (e.g. a 4G (fourth generation) cellular network), local area network, cellular telephone networks, and the like.

Display 131 of user control module 123 can be configured to display one or more windows, messages, icons, or other objects associated with emergency communications module 110. Display 131 can be an LCD (liquid crystal display), plasma, cathode ray tube, or another type of display.

Input device 132 of user control module 123 can be configured to allow a user to enter information into remote computing device 102 related to emergency communications module 110. For example, input device 132 can include buttons, a keyboard, a touchpad (separate from or integrated into display 131), microphone, mouse, trackball, or other input mechanisms. In some embodiments, display 131 and input device 132 are merged into the same component such as a touch screen.

Location determination module 113 can be configured to run on processing unit 121 and also can be configured to determine the location of remote computing device 102 and to communicate the location information to emergency sending module 111. In one example, remote computing device includes or is coupled to a GPS (global positioning satellite) receiver. Location determination module 113 can receive the location information from the GPS receiver in this example. In some examples, a GPS receiver can receive electrical signals from GPS satellites and use these electrical signals to calculate the location of remote computing device 102.

In the same or other embodiments, other methods can be used to determine the location of remote computing device 102. For example, remote computing device 102 can include a wireless networking device, and signals from and locations of the transmitters, routers, and other communications devices in communications network 108 can be used to calculate the current location of remote computing device 102.

Emergency sending module 111 can be configured to run on processing unit 121 and also can be configured to send an emergency trigger message and the location information to device communications module 151. In some examples, emergency sending module 111 can also receive communications from emergency response computer system 101.

Monitoring module 112 can be configured to run on processing unit 121 and further configured to monitor remote computing device 102 to determine if any telephone calls have been made to an emergency telephone number. In one example, monitoring module 112 can periodically check (e.g., one, five, ten, or thirty minutes) information stored in storage device 122 (e.g., telephone logs) to determine if any telephone calls have been made to an emergency telephone number. In other examples, monitoring module 112 can monitor in real time all outgoing telephone calls to determine if the telephone call is to an emergency number.

In some examples, if monitoring module 112 determines that a telephone call has been made to an emergency number, monitoring module 112 can notify emergency sending module 111 that an emergency call was made and the time of the emergency telephone call. Emergency sending module 111 can notify device communications module 151 of the emergency telephone call. In some examples, the notification of the emergency telephone call can be an emergency trigger message.

Device communications module 151 can be configured to run on processing unit 161 and also can be configured to communicate with remote computing devices 102, 103, and 104 using communications network 108. Device communications module 151 can be configured to receive emergency trigger messages from one or more users via remote computing devices 102, 103, and 104. In some examples, the emergency trigger messages can be text messages, and device communications module 151 can be configured to receive the emergency text messages from remote computing devices 102, 103, and 104. In various embodiments, device communications module 151 can send messages to remote computing devices 102, 103, and 104.

Such a communications interface can be any suitable form of wired or wireless connection including, but not limited to, USB (universal serial bus) connection, serial connection, cellular communication, IEEE 802.11, etc. This communications interface may also be multi-channel in some embodiments. For example, if the communications interface is implemented using cellular communications, device communications module 151 can be able to reroute communications from a cell tower that is, for some reason, unavailable to another functioning cell tower.

Alert reception module 153 can be configured to receive event or alert notifications from one or more third party sources. For example, alert reception module 153 can be configured to receive event or alert notifications from the U.S. Federal Emergency Management Agency (FEMA), the U.S. State Department (State Department), the U.S. Geological Survey (USGS), the U.S. Centers for Disease Control (CDC), the National Oceanic and Atmospheric Administration (NOAA), and the U.S. Food and Drug Administration (FDA). In some examples, alert reception module 153 can communicate the notifications to processing module 152. The notification can be considered an emergency trigger message in some examples.

User location update module 159 can be configured to run on processing unit 161 and can be further configured to perform user location identification updates. In many embodiments, emergency response module 150 can utilize user (i.e., target group individual) current location information to facilitate the response to an emergency. In some embodiments, user location update module 159 can obtain current location information of users and translate the information into a more usable format. For instance, GPS or location coordinate information may be translated into Military Grid Reference System (MGRS), and the GPS, location coordinate information and/or MGRS can be stored in user profiles (along with time/date stamps) in a database of storage device 162.

By way of non-limiting example, user location update module 159 location translation may occur as follows: location determination module 113 initiates GPS determination in remote computing device 102 via emergency communications module 110; emergency communications module 110 transmits GPS location information to device communications module 151; user location update module 159 updates the user profile stored in a database of storage device 162 with GPS location information. User location update module 159 also translates GPS location information into a city and country and populates current city and country into user profile. In some examples, user location update module translates GPS location information into Military Grid Reference System (MGRS) rubric and populates current MGRS location into user profile.

User location update module 159 can determine current location information for users at predefined time intervals (e.g., every 15 minutes, every 30 minutes, every 1 hour, every 2 hours, every 4 hours, every 12 hours, every 24 hours, etc.) or on-demand. For example, a system administrator can update the location information for all users or a subset of users when an emergency occurs. User profiles in storage device 162 can be updated to include current location information on a real-time basis, so as to only include the most current location information, or user profiles may be updated to include a history of location information (e.g., to include the last, e.g., 5, 10, 15, 20, 25, etc., locations, and/or to include 1 day, 2, days, 3 days, 4 days, 5 days, 1 week, 2 weeks, 3 weeks, 4 weeks, 1 month, 2 months, 3 months, 4 months, 5 months, 6 months, etc., worth of location information).

In some examples, user location update module 159 can update user locations on-demand as follows: a system administrator of emergency response computer system 101 logs into the emergency response computer system and opens user location update module 159; user location update module 159 includes a "Select User" function; and the system administrator selects the users from a recipient rules list for GPS update, which forces a GPS update to all selected EMS users.

Processing module 152 can be configured to run on processing unit 161 and also can be configured to process one or more emergency trigger messages to determine an emergency level. In some examples, processing module can include: (a) a location module 164; and (b) an analyzing module 163.

Location module 164 can be configured to run on processing unit 161 and also can be configured to determine a location of remote computing devices 102, 103, and 104. In some examples, location module 164 can instruct device communications module 151 to have remote computing device 102, 103, and 104 send their current locations to emergency response module 150. In the same or different examples, location module 164 can retrieve the locations of one or more of remote computing devices 102, 103, and 104 from a database in storage device 162. After location module 164 determines the locations of one or more of computing devices 102, 103, and 104, location module 164 can store the received locations in a database of storage device 162.

Analyzing module 163 can be configured to run on processing unit 161 and also can be configured to analyze the emergency trigger messages to determine a content of the emergency trigger messages. In some examples, analyzing module 163 is configured to analyze two or more emergency trigger messages to determine if the emergency trigger messages contain one or more predetermined trigger words. The predetermined trigger words can be word or phrases that indicate that a high-risk emergency is occurring or has occurred. For example, the predetermined trigger words can include homicide, murder, slaughter, rape, assault, arson, fire, weapon, gun, shoot, shooting, rifle, pistol, kill, handgun, bomb, explosion, gas, flood, earthquake, rob, steal, burglar, burglary, stolen car, stole car, stole my car, drug, cocaine, marijuana, and/or heroin.

In other examples, the emergency trigger message can be a sound recording. For example, the emergency trigger message can be a recording of a telephone call to an emergency response number (e.g., a 911 call). In this example, analyzing module 163 can automatically transcribe the telephone call into text and determine if the telephone call included any of the predetermined trigger words.

Response module 154 can be configured to run on processing unit 161 and also can be configured to determine a level of response to the two or more emergency trigger messages based upon the location of remote computing devices sending the emergency trigger messages and the content of the emergency trigger messages.

In some examples, response module 154 can determine the appropriate potential level of response to the emergency trigger messages based at least partially upon the frequency and content of the emergency trigger messages and location of the sending of the emergency trigger messages. In one example, the levels of response include a first (lower) level response and a second (higher) level response. After response module 154 determines the level of response, the level of response and the underlying information is communicated to determination module 156.

Determination module 156 is configured to run on processing unit 161 and also can be configured to use the location of the two or more emergency trigger messages to communicate with notification module 155 and determine which (if any) of first level response units 105 and second level response units 106 to notify.

Notification module 155 can be configured to run on processing unit 161 and also can be configured to notify the appropriate first response units and second level response units of the emergency.

Analyzing module 163 in combination with response module 154, determination module 156, and notification module 155 can analyze the incoming emergency trigger messages to determine if a triggering mass event has occurred based on content, volume, and/or timing of emergency communication and respond appropriately. By way of non-limiting example, analyzing module 163 in combination with response module 154 and determination module 156 analyzes content, time and frequency of message events, including 911 calls and emergency trigger messages from users; in the event the number of message events meets a predefined trigger threshold within a number of minutes specified, a mass event warning is initiated; notification module 155 creates a mass event warning message, including, e.g., information from the messages that triggered the mass warning event: user name, ID, location, message or call time, type of message (911 call or emergency response messaging system message), and, for example, message content: "[Subscriber Name] MASS EVENT WARNING HAS BEEN TRIGGERED BY RECEIPT OF [Number of Message Events from Mass Event Schedule] SUBMITTED TO THE SYSTEM IN [Mass Event Time From Mass Event Schedule] OR FEWER MINUTES. TRIGGER MESSAGES ARE ATTACHED TO THIS COMMUNICATION. RECOMMEND YOU BEGIN MONITORING THE INGRESS EMERGENCY MESSAGE PORTAL AVAILABLE AT [URL for Subscriber EMS Portal]."

Notification module 155 can enter mass event warning message into a subscriber's message log in a database of storage device 162 and transmits subscriber emails designated for receipt of emergency messages. Notification module 155 can capture data for report generation to first level response units 105 and/or second level response units 106. Response module 154 can send a request to user location update module 159 to initiate an all users (or a subset of users) update location request.

In the same or different embodiment, the analyzing module 163 can analyze messages for potential mass events based on content, e.g., particular trigger words in received emergency messages. Likewise, analyzing module 163 be configured to determine if an emergency event is occurring that requires reporting based on reporting requirements of The Jeanne Clery Disclosure of Campus Security Policy and Campus Crime Statistics Act. By way of non-limiting example, analyzing module 163 can analyze messages as follows: analyzing module 163 analyzes incoming emergency messages for trigger words that suggest a Clery reporting requirement incident may have occurred; in the event that the word(s) from the Clery event trigger list are found in an incoming emergency trigger message, a Clery Event message can be initiated by notification module 155; notification module 155 can create a Clery Event message that includes, e.g., information from the messages that triggered the message including: user name, ID, location, message or call time, and message content, for example: "[Subscriber Name] CLERY EVENT WARNING HAS BEEN TRIGGERED BY RECEIPT OF AN EMERGENCY MESSAGE SUBMITTED TO THE SYSTEM THAT INCLUDES THE WORDS [trigger words from message]. TRIGGER MESSAGE IS ATTACHED TO THIS COMMUNICATION. MESSAGE HAS ALSO BEEN SENT TO CLERY MESSAGE EMAIL ADDRESS [Subscriber Clery email Address]"; Clery Event Warning Message is entered into subscriber Clery message log in a database in storage device 162 and transmitted to second level response units designated for receipt of Clery messages; and data is captured for report generation.

Administration module 157 can be configured to run on processing unit 161 and further configured to be used by a system administrator to administer and control emergency response module 150. For example, a system administrator using administration module 157 can create a user introduction/set-up to provide an instructional "welcome" message to provide to users of remote computing devices 102, 103, and 104, providing details to a new user of what emergency messaging system 100 does and when it should be used. Messages may have a default text, or may be edited by the system administrator. In certain embodiments, the welcome message may be sent to all users/individuals of a target group upon joining of the group (e.g., orientation at a university, workplace, etc.).

Furthermore, system administrator using administration module 157 can perform general set-up and configuration functions. By way of non-limiting example, a system administrator can create a user introduction/set-up using administration module 157 as follows: a system administrator logs onto administration module 157 and enters configuration page; the system administrator enters page for entry of system user advice; the system administrator edits/writes user message detailing use of system interface; the system administrator hits "Save Changes" to enter new message into the administration module 157; administration module 157 saves change to change log with a copy of the previous message, a copy of the new message, user information for the system administrator making the change, date, and time; users of remote computing devices 102, 103, and/or 104 receive a system use notice upon initial interface with emergency messaging system service as push message and optional redundant email. An exemplary message may read as follows:

[Subscriber Name] EMERGENCY MESSAGE SYSTEM:
  [Subscriber Name] has subscribed to the emergency messaging system. Through the use of the Emergency Message button on the [Subscriber Name] App, you can send a message to law enforcement and [Subscriber Name] in the event of an emergency, to request assistance or to report a crime. The emergency messaging system will provide your information to law enforcement to expedite a response. Use the emergency messaging system as you would calling 911 from a regular phone.

Administration module 157 can also be configured to provide the system administrator the ability to designate mass event trigger words. By way of non-limiting example, a system administrator can create mass event trigger words as follows: a system administrator logs into administration module 157 and enters configuration page; the system administrator enters page for entry of system mass event trigger list; the system administrator edits/writes Trigger List as desired; the system administrator hits "Save Changes" button when complete; the administration module 157 saves change to change log with a copy of the previous mass event trigger list, a copy of the new mass event trigger list, user information for the system administrator making the change, date, and time.

Administration module 157 can be further configured to also provide the system administrator the ability to designate Clery event trigger words. By way of non-limiting example, a system administrator may create Clery event trigger words as follows: the system administrator logs onto administration module 157 and enters configuration page; the system administrator enters page for entry of emergency system Clery event trigger list that is stored in a database of storage device 162; the system administrator edits/writes Clery event trigger list; the system administrator hits "Save Changes" button when complete; administration module 157 saves change to change log with a copy of the previous Clery event trigger list, a copy of the new Clery event trigger list, user information for the system administrator making the change, date, and time.

As described herein, the systems and methods may provide emergency messaging services in many suitable messaging services (e.g., text, email, voice, text to voice, etc.). Administration module 157 can also be configured to provide the ability to the system administrator to review and order method(s) of message delivery. By way of non-limiting example, a system administrator may review and order message delivery as follows: the system administrator logs onto administration module 157 and enters configuration page; the system administrator enters page for entry of cascade options, including, e.g., push, SMS, email, text to voice, etc.; the system administrator may select numbered boxes to indicate order of preference for attempt, lowest to highest with default order, e.g., 1) push, 2) SMS, 3) email, 4) text to voice, etc., with an editable time interval for attempt of next transmission option with default, e.g., of 60 seconds; the system administrator may also check box to indicate "always send" with default as email; administration module 157 saves change to change log with a copy of the previous selections, a copy of the new selections, user information for the EMS system administrator making the change, date, and time. During an emergency, emergency response module 150 can track send time and receipt of delivery confirmation and cascade if delivery interval is exceeded.

In additional aspects, administration module 157 can be configured to allow a system administrator to establish various scheduling, calendaring and reporting features. For instance, a schedule for establishing a system administrator for notification of potential emergency situations can be established, as well as a schedule for automatic generation of reports (e.g., reports of potential Clery events, potential mass events, routine logs of emergency messages, repeat users of the IEMS system, etc.). In addition, administration module 157 can be configured to allow a system administrator to set predefined thresholds for various system functionalities, e.g., mass event trigger limits such as number of messages within a set time, etc., and may designate an administrator to monitor and adjust as needed (e.g., based on scheduled upcoming events). Such scheduling functions may be compatible with calendaring programs such as Microsoft® Outlook, Google® Calendar, Lotus Notes® Calendar, etc.

Mapping module 158 can be configured to run on processor unit 161 and further configured to allow a system administrator, a first level response unit 105, and/or second level response units 106 to access maps of specific geographic regions and/or structures in these geographic areas. By way of non-limiting example, mapping module 158 includes or is in communication with a display apparatus that comprises a touch screen, for example. Selected areas of the target geographic area (e.g., selected buildings, floors, parks, zones, etc.) may be "selected" by touching those areas via the touch screen. Mapping module 158 can load maps of all areas within the target geographic area that have been selected. In various embodiments, the graphical display may include zoom and toggle functions to aid in selection. Zoom features will generally maintain the same grid system, recalibrating the grid GPS integrated coordinates to maintain accuracy. In certain embodiments, clicking/selecting the graphical representation and moving the selection will move the view field.

To facilitate selection of the geographical area of interest, in certain embodiments, mapping module 158 can provide for the integration of location names into the graphical representation of the target geographical area via a website or other suitable graphical user interface may be used. By way of non-limiting example, mapping module 158 provides for integration location names as follows: graphical representations of a target geographical area (e.g., graphical maps) are uploaded into database(s) of storage device 162 and published for display to a display apparatus graphical user interface; the system administrator is prompted to give the map a name (e.g. Main Campus), which is saved and populated to a database of storage device 162; mapping module 158 creates an alphanumeric grid over the graphical representation, and loads geospatial location of target geographical area; mapping module 158 translates grid coordinates to GPS coordinates and associates GPS coordinates within the grid box; mapping module 158 can have a "Load Previous Map" function that may load previous builds of the same target geographical area into current working map, e.g., for comparison; mapping module 158 can automatically identify map features that appear to be structures (e.g., based on feature recognition algorithms); the system administrator can identify a structure or feature of the map in several ways, including by clicking on the map to select a discrete feature, using a draw dialogue, or a drag and select dialogue, each of which opens a dialogue box for labeling the structure or feature; once the system administrator identifies a structure or feature and provides a name, mapping module 158 populates the name to a list of locations associated with that map; mapping module 158 calculates a coordinate range for the space inside the map building/feature and associates that coordinate range with that map building/feature (within a predefined coordinate tolerance range).

In other embodiments, mapping module 158 can be configured to facilitate a manual pin drop location creation mechanism that may be used to create ad hoc geographic area selection zones. By way of non-limiting example, if no location names or other groupings adequately define a desired geographic area messaging, pin drop location creation may be performed as follows: an subscriber administer may press a "Pin Drop" button on the graphical interface of mapping module 158, which will initiate a user interface to allow the subscriber administer to drop "pins" in the geographic area to define a selected area; once three or more pins are dropped and the button is pushed to stop dropping pins, mapping module 158 will initiate a dialogue box, prompting for a location name; once entered, the location name will populate to the locations list; "mousing" or selecting over a pin for the completed pin location will display the location name and give an option to delete the location.

"Response computer system 101," as used herein, can refer to a single computer, single server, or a cluster or collection of servers. Typically, a cluster or collection of servers can be used when the demands for processing are beyond the reasonable capability of a single server or computer. In many embodiments, the servers in the cluster or collection of servers are interchangeable from the perspective of remote computing device 102, 103, and 104.

In some examples, a single server can include device communications module 151, processing module 152, alert reception module 153, response module 154, notification module 155, determination module 156, administration module 157, mapping module 158, and user location update module 159. In other examples, a first server can include a first portion of these modules, and one or more second servers can include a second, possibly overlapping, portion of these modules. In these examples, emergency messaging system 100 can comprise the combination of the first server and the one or more second servers.

In some examples, storage device 162 can include one or more databases (e.g., indexes) to store information about incoming emergency trigger messages. All of these databases can be a structured collection of records or data, for instance, which is stored in storage device 162. For example, the databases stored in storage device 162 can be an XML (Extensible Markup Language) database, MySQL, or an Oracle® database. In the same or different embodiments, the indexes could consist of a searchable group of individual data files stored in storage device 162.

In many embodiments, a profile for each portable communication device associated with each user can be stored in one or more databases of storage device 162. The profile may include information of the individual associated with the portable communication device, such as name, age, residence, email address, phone number, emergency contact information, current location of the user, past locations of the user, links to school/health/employment/etc.

In various embodiments, operating systems 124 and 165 can be software programs that manage the hardware and software resources of a computer, remote computing device, and/or a computer network. Operating systems 124 and 165 can perform basic tasks such as, for example, controlling and allocating memory, prioritizing the processing of instructions, controlling input and output devices, facilitating networking, and managing files. Examples of common operating systems for a computer include Microsoft® Windows, Mac® operating system (OS), UNIX® OS, and Linux® OS. Common operating systems for a mobile device include the iPhone® and iPad® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows® Phone operating system by Microsoft Corp. of Redmond, Wash., or a Symbian operating system by Nokia Corp. of Espoo, Finland.

As used herein, "processing unit" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

Figure 2:
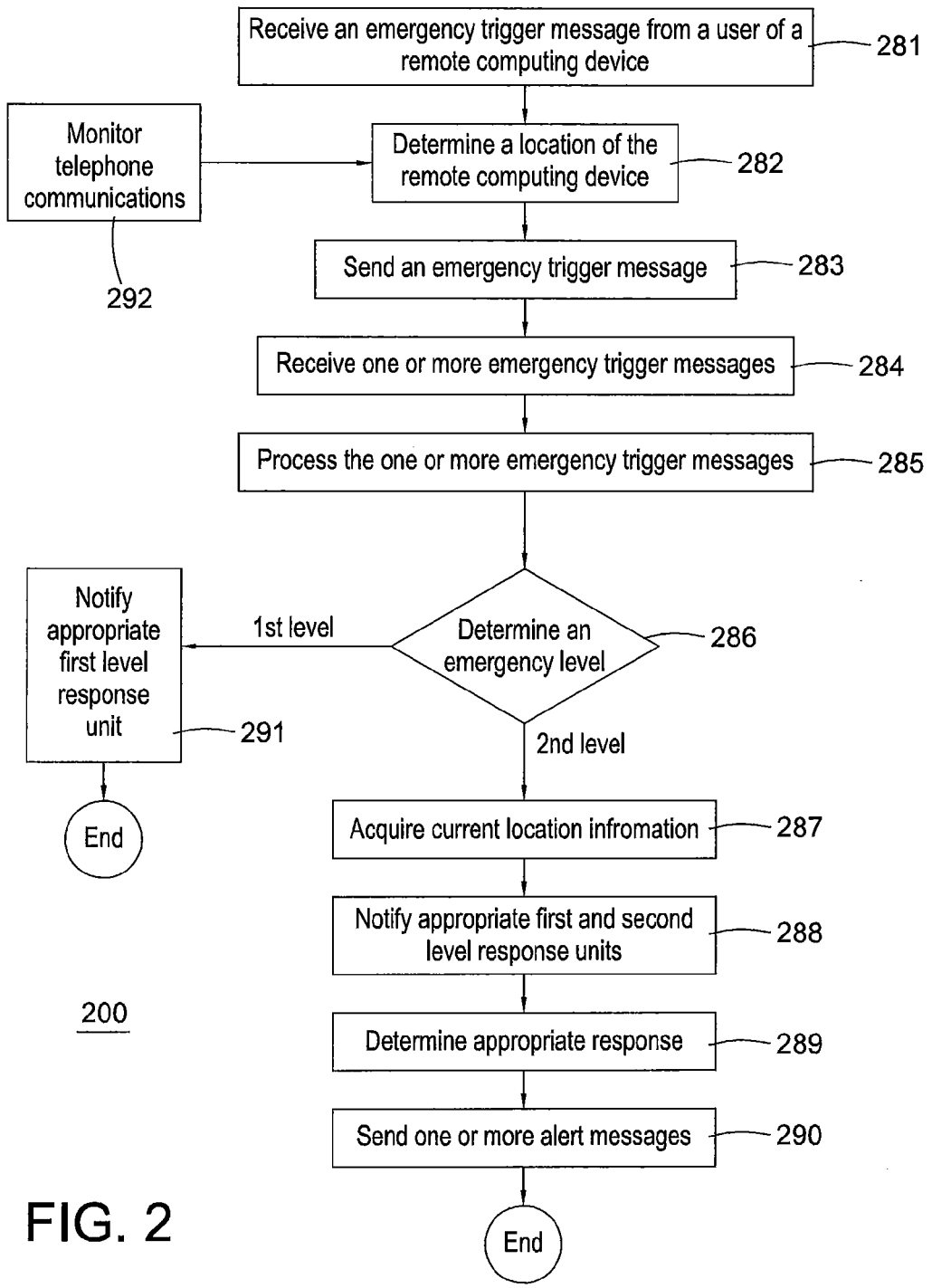
FIG. 2 illustrates a flow chart for an embodiment of a method of responding to an emergency, according to the first embodiment.

FIG. 2 illustrates a flow chart for an embodiment of a method 200 of responding to an emergency, according to a first embodiment. Method 200 is merely exemplary and is not limited to the embodiments presented herein. Method 200 can be employed in many different embodiments or examples not specifically depicted or described herein. In some embodiments, the activities, the procedures, and/or the processes of method 200 can be performed in the order presented. In other embodiments, the activities, the procedures, and/or the processes of method 200 can be performed in any other suitable order. In still other embodiments, one or more of the activities, the procedures, and/or the processes in method 200 can be combined or skipped.

As described herein, referring back to FIG. 1, the systems of methods of the disclosure may include one-way and/or two-way communication between users and system administrators, first level response units 105, and/or second level response units 106. In some embodiments, emergency response module 150 can receive communications of users and record, log, and/or otherwise utilize these communications to manage a potential emergency situation. Emergency trigger messages may be received via phone, email, text, text to voice, etc. The emergency trigger message can be received through emergency communications module 110 running on processing unit 121 of the user's remote computing device, or can be provided by emergency services to the subscriber administrator. Once an emergency message is received from a user, the message may be populated in databases of storage device 162, and the message may be analyzed for a potential emergency situation.

Returning to FIG. 2, method 200 includes an activity 281 of receiving an emergency trigger message from a user of a remote computing device. In some embodiments, the emergency trigger message is received from a user of the remote computing device using an emergency sending module of an emergency communications module. The emergency communications module and emergency sending module can be running on a processor of the remote computing device.

Referring back to FIG. 1, for example, a user can activate emergency communications module 110 on remote computing device 102, and emergency sending module 111 can be opened. Emergency sending module 111 can present a user of remote computing device 102 a window on display 131 into which the user can type the emergency trigger message using input device 132. In some examples, the emergency trigger message is a text message, and the user can type the text message into the window of emergency sending module 111. In other examples, the emergency trigger message can be a sound recording, and the user can record the emergency trigger message using input device 132.

Referring again to FIG. 2, method 200 in FIG. 2 continues with an activity 282 of determining a location of the remote computing device. In some examples, a location determination module of the emergency communications module can determine the location of the remote computing device.

Referring to FIG. 1, for example, after the user submits the emergency trigger message, emergency sending module 111 can request the current location of remote computing device 102 from location determination module 113. In other examples, emergency sending module 111 can request the current location of remote computing device 102 from location determination module 113 when the user activates emergency communications module 110 or when the user begins entering the emergency trigger message into remote computing device 102. After location determination module 113 determines the location, location determination module 113 can communicate the location to emergency sending module 111.

Referring back to FIG. 2, method 200 includes an activity 283 of sending the emergency trigger message to the response computer system. In some examples, sending the emergency trigger message can include sending an audio recording or text message with one or more trigger words to the response computer system using the emergency module. In other examples, sending the emergency trigger message can include a telephone call to a human operator in communication with response computer system 101.

Referring to FIG. 1, for example, after the user submits the emergency trigger message and emergency sending module 111 receives the current location information from location determination module 113, emergency sending module 111 sends the emergency trigger message and the current location information to device communications module 151 over communications network 108. In other examples, if emergency sending module 111 does not receive (or location determination module cannot determine) the current location information within a predetermined period of time (e.g., 1, 5, 10, or 30 seconds), emergency sending module 111 can send the emergency trigger message to device communications module 151 without the current location information.

Next, method 200 of FIG. 2 includes an activity 284 of receiving two or more emergency trigger messages from two or more remote computing devices. In some examples, a response computer system can receive emergency trigger messages from two or more users via two or more remote computing devices. In other examples, activity 284 includes receiving only one emergency trigger message, and activities 284-292 can be performed with only one emergency trigger message.

In some examples, receiving the two or more emergency trigger messages can include receiving one or more text messages from users of the remote computing devices. In various embodiments, receiving the two or more emergency trigger messages further can include receiving an audio recording. The audio recording can be a recording made by a user of a remote computing device or audio recorded from an emergency call to an emergency system (e.g., a recording of a 911 call). In these examples, a device communications module can convert the audio recording into text.

In the same or different examples, at least one of the trigger messages can be an alert message from a third party source. For example, at least one of the emergency trigger messages can be an event or alert notifications from FEMA, the State Department, USGS, CDC, NOAA, and/or FDA.

Figure 3:
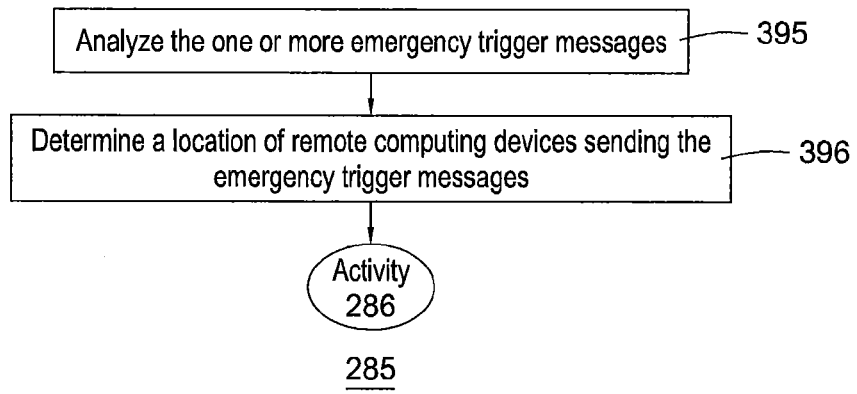
FIG. 3 illustrates a flow chart for an exemplary embodiment of an activity of processing two or more emergency trigger messages, according to the first embodiment.

Method 200 in FIG. 2 continues with an activity 285 of processing the two or more emergency trigger messages. FIG. 3 illustrates a flow chart for an exemplary embodiment of activity 285 of processing the emergency trigger messages, according to the first embodiment.

Referring to FIG. 3, activity 285 includes a procedure 395 of analyzing the two or more emergency trigger messages. In some examples, as shown in FIG. 1, analyzing module 163 can determine a content of the two or more emergency trigger messages. For example, analyzing module 163 can analyze the two or more emergency trigger messages to determine if the two or more emergency trigger messages contain one or more predetermined trigger words. The predetermined trigger words can be word or phrases that indicate that a high-risk emergency is occurring or has occurred.

Referring back to FIG. 3, activity 285 in FIG. 3 continues with a procedure 396 of determining an origination location of at least part of the two or more emergency trigger messages. In some examples, the location information was sent to the response computer system as part of the emergency trigger message. In other examples, the location information was not provided as part of the emergency trigger information. In these examples, referring to FIG. 1, location module 164 can contact the remote computing device that sent the emergency trigger message (e.g., remote computing device 102, 103, or 104) via device communications module 151 and communications network 108. In other examples, location module 164 can query storage device 162 to determine the current or last known location of the remote computing device that sent the emergency trigger message. In these other examples, remote computing devices 102, 103, and 104 can periodically communicate their locations to emergency response module 150, which can store their locations in storage device 162.

If the emergency trigger message includes one or more of the predetermined trigger words, analyzing module 163 can communicate the emergency trigger message along with the location of the remote computing device, if known, to response module 154. After procedure 396 of FIG. 3, activity 285 is complete.

Referring again to FIG. 2, method 200 of FIG. 2 can subsequently include an activity 286 of determining an emergency level. In some examples, the emergency levels can include the first (i.e., lower) level of response or a second (i.e., higher) level of response. In some examples, the level of response to the emergency trigger messages can be determined based upon the location of the senders of the two or more emergency trigger messages and the content of the two or more emergency trigger messages from the senders.

In some examples, determining the level of response can include determining if a predetermined number of the two or more emergency trigger messages include one or more of the predetermined trigger words. In these embodiments, if the predetermined number of messages include the trigger words, the emergency level is the second level of response; otherwise, the emergency level is the first level of response.

In the same or different examples, determining the level of response can include determining if a predetermined number of the two or more emergency trigger messages included one or more of the predetermined trigger words and if the emergency trigger messages including the predetermined trigger words were sent from locations within a predetermined distance of each other. In these embodiments, if these conditions are met, the emergency level is the second level of response; otherwise, the emergency level is the first level of response.

In the same or different embodiment, if the emergency trigger message is an event or alert notifications from a third party source, the emergency level is the second level of response regardless of the content of the message or if any other emergency trigger messages were received.

Referring again to FIG. 1, in some embodiments, response module 154 can determine if a predetermined number of emergency trigger messages have been received with one or more of the trigger words within a predetermined time and have been sent from locations within a predetermined distance of each other.

For example, if response computer system 101 received ten trigger alert messages including the trigger word "gun" and if all ten messages were sent within 500 meters of each other, response module 154 can assign a second level of response. In another example, if eight trigger messages include the trigger word "fire" and if all eight messages were sent from inside the same building, response module 154 can assign a second level of response. In still another example, if a trigger message was received from the U.S. State Department and warned U.S. citizens about traveling to a specific country or region, response module 154 can assign a second level of response. In a further example, if a trigger message from NOAA with a tornado warning for a predetermined geographic area, response module 154 can assign a second level of response.

On the other hand, if one emergency trigger message is received stating that a purse theft occurred in a specific building, response module 154 can assign the lower first level response to the emergency. In another example, if an emergency message is received with none of the trigger words, response module 154 can assign the lower first level response to the emergency.

Figure 4:
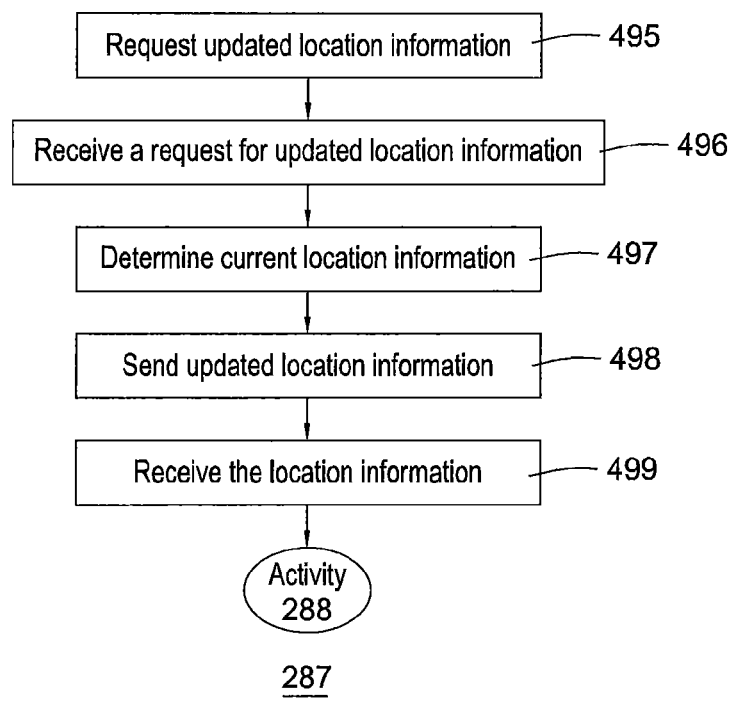
FIG. 4 illustrates a flow chart for an exemplary embodiment of an activity of acquiring current location information, according to the first embodiment.

Referring back to FIG. 2, if the emergency level is a second level of response, method 200 in FIG. 2 continues with an activity 287 of acquiring current location information. In some examples, current location information can be requested from every remote computing device that is part of emergency messaging system 100. In other examples, current location information can be requested from a portion of the remote computing devices that are part of emergency messaging system 100. FIG. 4 illustrates a flow chart for an exemplary embodiment of activity 287 of acquiring current location information, according to the first embodiment.

Referring to FIG. 4, activity 287 includes a procedure 495 of requesting updated location information. In some examples, referring to FIG. 1, location module 164 can communicate to remote computing device 102, 103, or 104 via device communications module 151 and can request updated location information from each of remote computing device 102, 103, or 104.

Referring again to FIG. 4, activity 287 in FIG. 4 continues with a procedure 496 of receiving a request for updated location information. In some examples, emergency communications module 110, 143, and 144 (FIG. 1) of remote computing devices 102, 103, 104 (FIG. 1), respectively, can receive the request for the updated location information from device communications module 151 (FIG. 1) via communications network 108 (FIG. 1).

Subsequently, activity 287 of FIG. 4 includes a procedure 497 of determining current location information. In some examples, procedure 497 can be similar to or the same as activity 282 of FIG. 2.

Next, activity 287 of FIG. 4 includes a procedure 498 of sending updated location information. In some examples, emergency communications modules 110, 143, and 144 (FIG. 1) of remote computing devices 102, 103, 104 (FIG. 1), respectively, can send the updated location information to device communications module 151 (FIG. 1) via communications network 108 (FIG. 1).

Activity 287 in FIG. 4 continues with a procedure 499 of receiving the location information from at least a portion of the two or more electrical devices. In some examples, referring to FIG. 1, device communications module 151 can receive the location information from at least a portion of remote computing devices 102, 103, and 104. Device communications module 151 can communicate the location information to location module 164, which can store the location information in storage device 162.

In many examples, device communications module 151 does not receive current location information from all of remote computing devices 102, 103, and 104. One or more of remote computing devices 102, 103, and 104 may not provide location information because, for example, the remote computing device is turned off, the remote computing device does not include a GPS or other location determination sub-system, or the user of the remote computing device has disabled the location determination sub-system. After procedure 499, activity 287 is complete.

Figure 5:
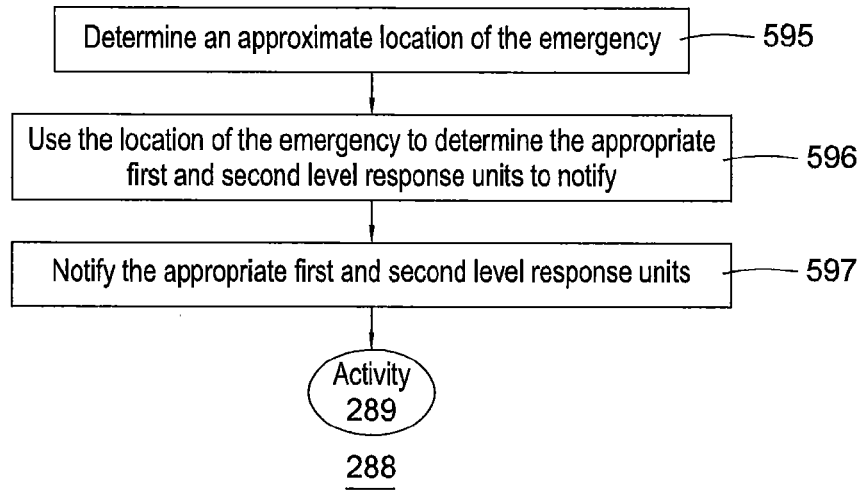
FIG. 5 illustrates a flow chart for an exemplary embodiment of an activity of notifying first and second level response units, according to the first embodiment.

Referring back to FIG. 2, method 200 includes an activity 288 of notifying appropriate first and second level response units. In some examples, referring to FIG. 1, response module 154 can instruct device communications module 151 to notify first level response units 105 and second level response units 106 of the emergency. FIG. 5 illustrates a flow chart for an exemplary embodiment of activity 288 of notifying first and second level response units, according to the first embodiment.

In some examples, the emergency response computer system can be integrated with or in communications with external emergency or security systems (e.g., security cameras, fire alarms, emergency lighting). Accordingly, in addition to notifying the first and second level response units, response module 154 (FIG. 1) can communicate the emergency level or other information with these external systems to, e.g., activate the external systems that are near the location of the emergency. In one example, response module 154 (FIG. 1) can communicate to a security monitoring systems in the region around the emergency and these security monitoring systems can provide the video feeds from video cameras in the area to the emergency response computer system. In some embodiments, emergency response computer system 101 (FIG. 1) can control the video cameras. The images or videos from these video cameras can be attached to or embedded in the notifications that are communicated to the first and second level response units.

Referring to FIG. 5, activity 288 includes a procedure 595 of determining an approximate location of the emergency. In some examples, response module 154 (FIG. 1) can use the location information provided along with the emergency trigger messages to determine the location of the emergency.

Activity 288 in FIG. 5 continues with a procedure 596 of using the location of the emergency to determine the appropriate first and second level response units to notify. In some examples, information can be stored in storage device 162 that identifies the appropriate first and second level response units to notify if an emergency occurs at a specific location. In this example, response module 154 (FIG. 1) can access the information storage device 162 (FIG. 1) to determine the appropriate first and second level response units to notify of the emergency.

Subsequently, activity 288 of FIG. 5 includes a procedure 597 of notifying the appropriate first and second level response units. For example, referring to FIG. 1, response module 154 can communicate to device communications module 151 which first and second level response units to notify. Device communications module 151 can notify the appropriate first and second level response units via communications network 108. After procedure 597, activity 288 is complete.

Figure 6:
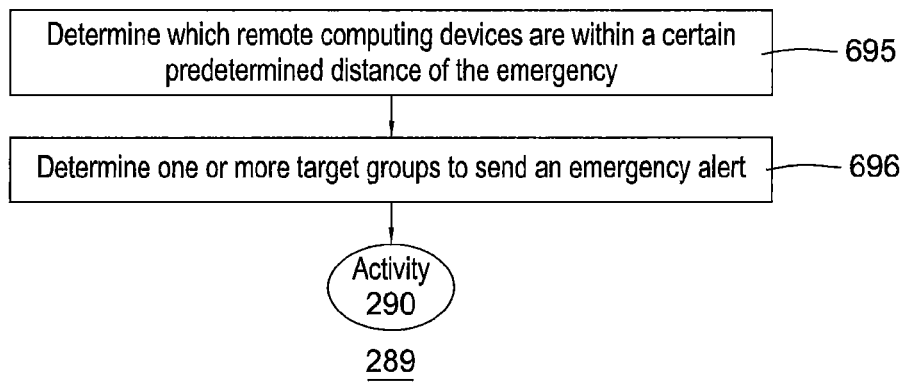
FIG. 6 illustrates a flow chart for an exemplary embodiment of an activity of determining the appropriate response, according to the first embodiment.

Referring again to FIG. 2, method 200 of FIG. 2 further includes an activity 289 of determining the appropriate response to the emergency. FIG. 6 illustrates a flow chart for an exemplary embodiment of activity 289 of determining the appropriate response to the emergency, according to the first embodiment.

Referring to FIG. 6, activity 289 includes a procedure 695 of determining which remote computing devices are within a certain predetermined distance of the emergency. For example, referring to FIG. 1, determination module 156 can use the location information of at least a portion of remote computing device 102, 103, and 104 that is stored in storage device 162 to determine which remote computing devices 102, 103, and 104 are within a certain predetermined distance of the emergency.

In one embodiment, mapping module 158 can be used to provide a graphical display of a target geographic area. Using mapping module 158, the system administrator (or first or second level response units 105 and 106) can select a geographic area of interest (i.e., as shown in FIGS. 8-14, by way of example, a subset of the target geographic area—a selection of buildings of a university campus, designated quadrants/regions of a target geographic area, a select number of floors of an office building, etc.) from the graphical display of the target geographic area.

Activity 289 further includes a procedure 696 of determining one or more target groups to send an emergency alert. In some examples, the second level response unit determines: (1) if one or more emergency alerts should be sent; and (2) to whom to send the emergency alerts. In some examples, the second level response unit can decide to send the emergency alert to all of the users of the emergency messaging system or a sub-group of all of the users of the emergency messaging system.

For example, the second level response unit can determine to send a first emergency alert message to a first portion of the two or more remote computing devices that are within a first predetermined distance of the emergency and send a second emergency alert message to a second portion of the two or more remote computing devices that are within a second predetermined distance of the emergency. The second level response unit can input into the determination module instructions regarding which target groups to send an emergency alert. The determination module can communicate this information to the notification module.

In certain aspects, notification module 155 (and/or device communications module 151) can provide graphical interface messaging. In certain embodiments, a system administrator can use notification module 155 to send emergency messages to individuals of a target group within a specified geographic area by selecting a geographic area of interest from a graphical representation of a target geographic area.

For example, notification module 155 can send an emergency message to individuals of a target group located within the selected geographic area of interest. By way of non-limiting example, the graphical interface messaging using notification module 155 can occur as follows: the system administrator logs into emergency response computer system 101, and mapping module 158 provides a graphical representation of a target geographic area; the system administrator selects a geographic area of interest from the graphical representation, and the selection is loaded into the mapping module 158; the system administrator selects an option for "Draft Message" or "Load Message" from notification module 155, which initiates a "Outgoing Message" dialogue box; "Draft Message" can provide a pop-up dialogue box to allow drafting of text of a desired message, while "Load Message" may provide a pop-up dialogue box with previously saved messages and pre-drafted messages. The system administrator may select an option for "Add User," "Exclude User" from the "Outgoing Message" dialogue, which initiates recipient rule dialogue boxes.

In some examples, the message can also be sent to: user emails obtained from user profiles in storage device 162, subscriber emails designated for receipt of emergency messages, an emergency message log, and/or may be populated to an Emergency Message Dialogue display on the graphical interface of the mapping module.

Figure 8:
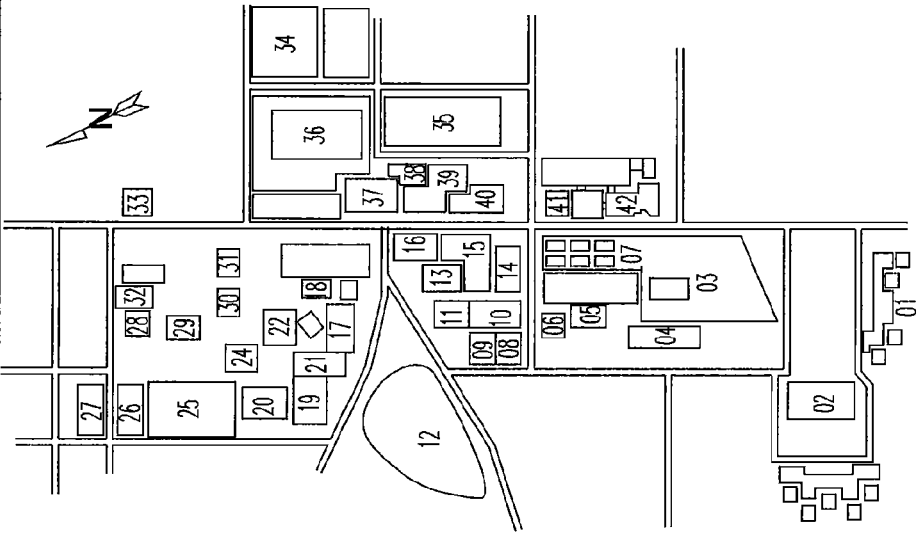
Figure 9:
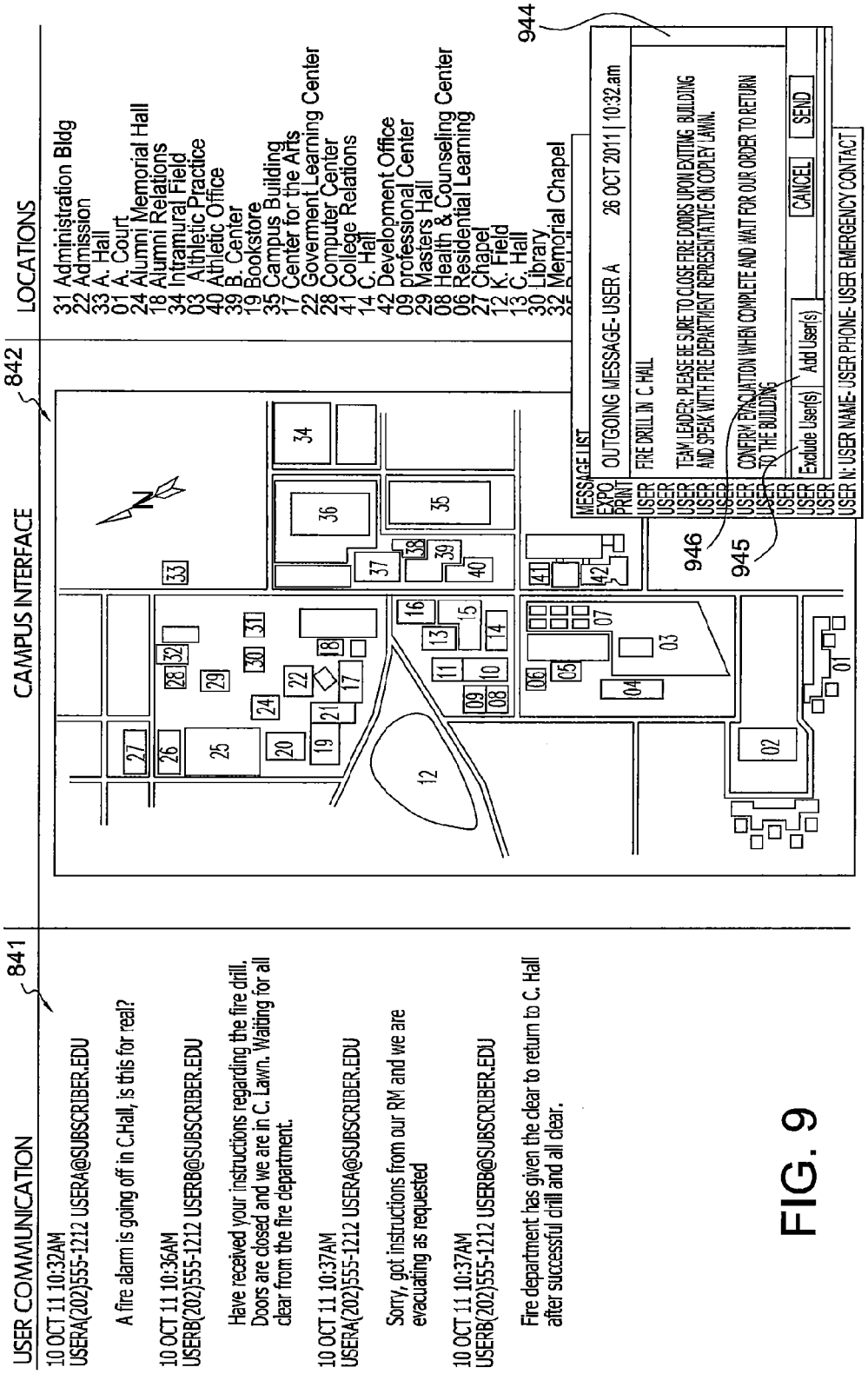
Figure 10:
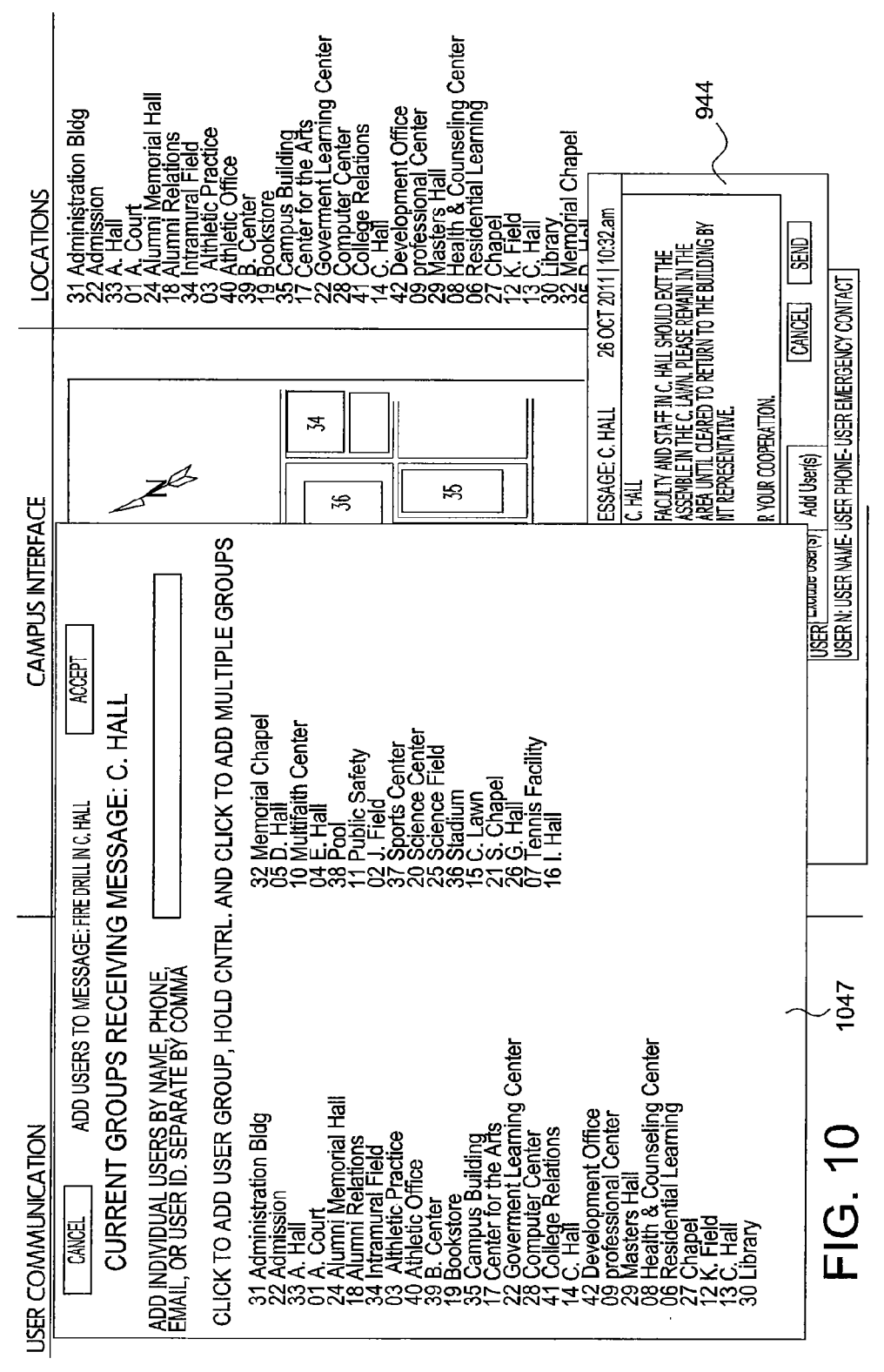
Figure 11:
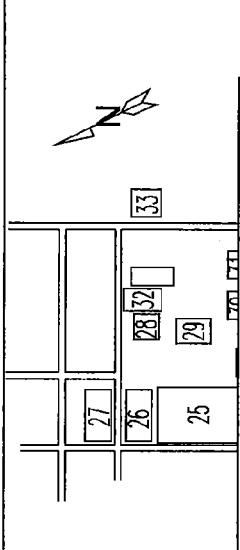
Figure 13:
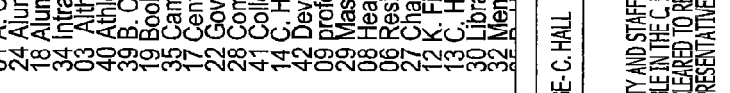
Figure 14:
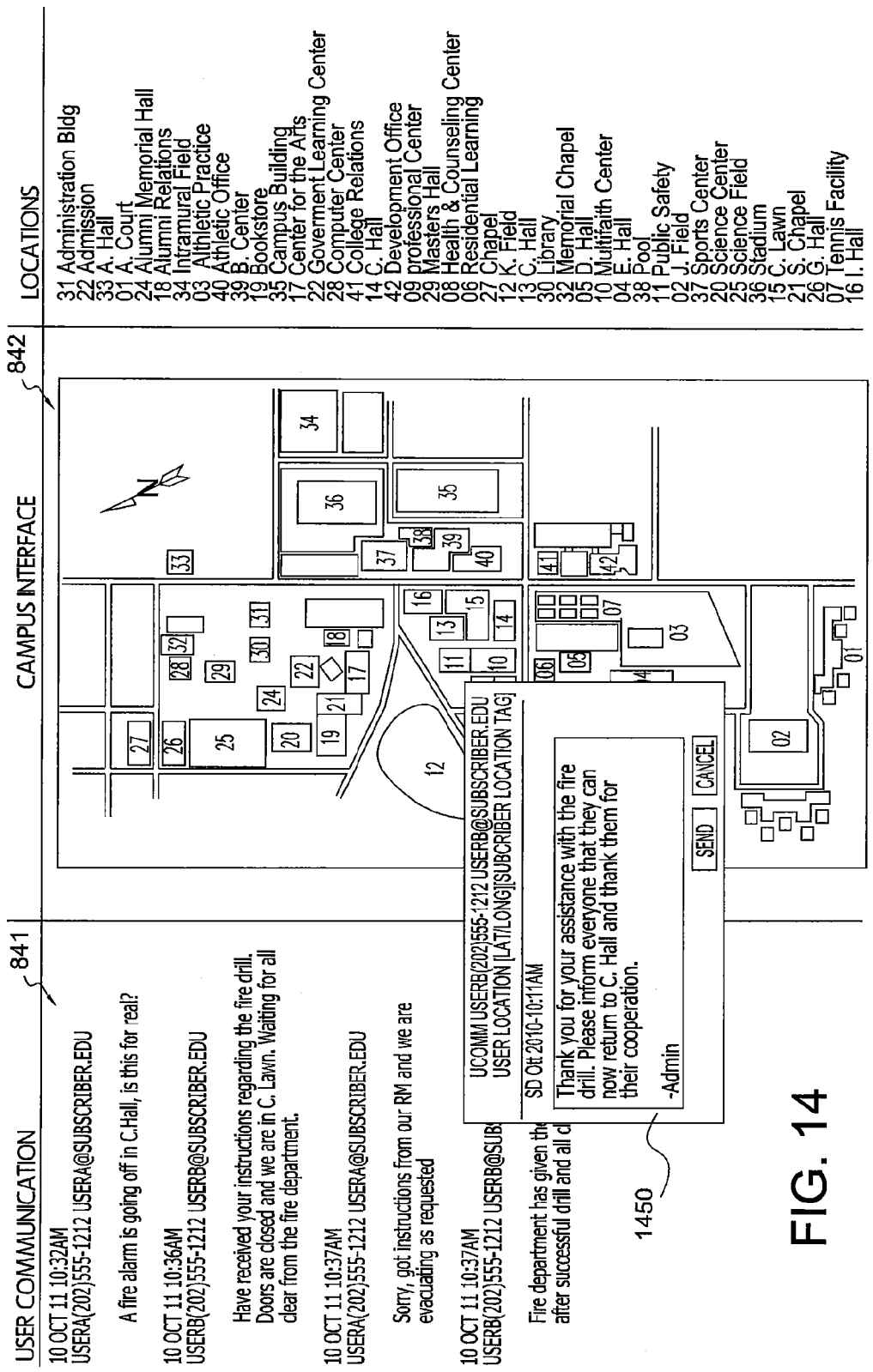

In same or different embodiment, by way of non-limiting example with reference to FIGS. 8-14, the graphical interface messaging may occur as follows: the system administrator logs into mapping module 158, and graphical representation of target geographical area is loaded to graphical user interface (FIG. 8); an emergency message dialogue space 841 populates on the left side of the map interface 842. User submitted emergency trigger messages populated to the emergency message dialogue space 841 in real time. As shown in FIG. 8, the information shown in emergency message dialogue space 841 can include, for example, user name, identification number, phone number, email, location information, etc. from the user profiles. As shown in FIG. 9, a system administrator can click on an incoming message to open a message pop-up box 944, which includes the user as the initial recipient and includes an exclude button 945 to exclude users as recipients and an add button 946 to add users as recipients. As shown in FIGS. 10-12, the system administrator may select, add, and exclude users to finalize recipient rules lists using windows 1047 (FIG. 10) and 1148 (FIG. 11). Notification module 155 can populate recipient rules list in window 1249, as shown in FIG. 12. As illustrated in FIGS. 13-14, the system administrator can use notification module 155 can send message 1450 to the recipient. After procedure 696, activity 289 is complete.

Figure 7:
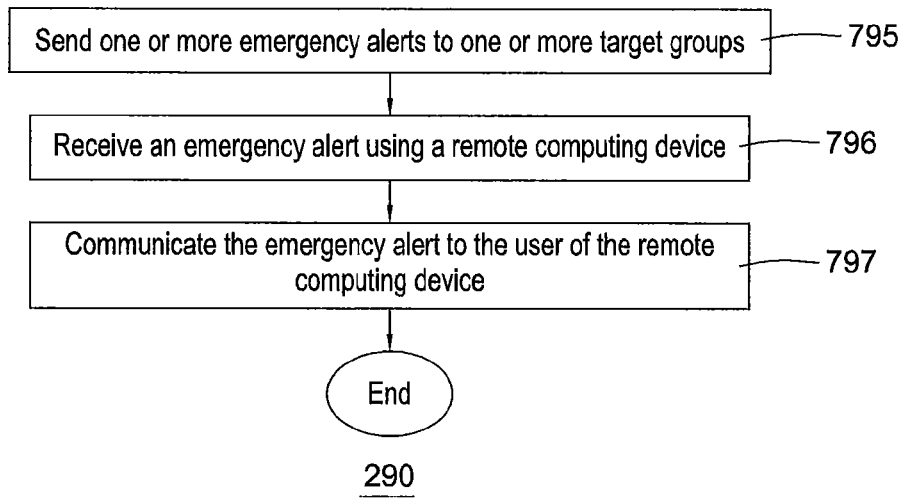
FIG. 7 illustrates a flow chart for an exemplary embodiment of an activity of sending the first emergency alert message, according to the first embodiment.

Next, referring again to FIG. 2, method 200 of FIG. 2 includes an activity 290 of communicating one or more emergency alerts to the target groups. FIG. 7 illustrates a flow chart for an exemplary embodiment of activity 290 of communicating the first emergency alert message to one or more target groups, according to the first embodiment.

Referring to FIG. 7, activity 290 includes a procedure 795 of sending one or more emergency alerts to one or more target groups. In some examples, notification module 155 (FIG. 1) can send the emergency alerts to the target groups.

When message and recipient rules functions are complete, the system administrator hits "send," and the message is distributed according to the rules list with "[Subscriber Name] Emergency Message."

The system administrator's login identification, time, date and location can be recorded to an emergency message log; and an email may be sent to the subscriber email designated for receipt of emergency messages with such information and a copy of the message.

Activity 290 in FIG. 7 continues with a procedure 796 of receiving an emergency alert using a remote computing device. In some examples, emergency communications module 110, 143 and/or 144 can receive an emergency alert from notification module 155 (FIG. 1) via communications network 108 (FIG. 1).

Subsequently, activity 290 of FIG. 7 includes a procedure 797 of communicating the emergency alert to the user of the remote computing device. In some examples, the emergency alert can be communicated to the user of the remote computing device 102, 103, and/or 104 using a display on the device. In some embodiments, procedure 797 can be part of procedure 795. After procedure 797, activity 290 is complete, and method 200 is complete when the emergency level is a second level of response emergency.

Referring back to FIG. 2, if the emergency level is a first level of response, method 200 in FIG. 2 includes an activity 291 of notifying the appropriate first response unit if the level of response after activity 286 of determining the emergency level. In some examples, notifying the appropriate first level response unit can be similar to activity 289. After activity 291, method 200 is complete when the emergency level is a first level of response emergency.

Figure 15:
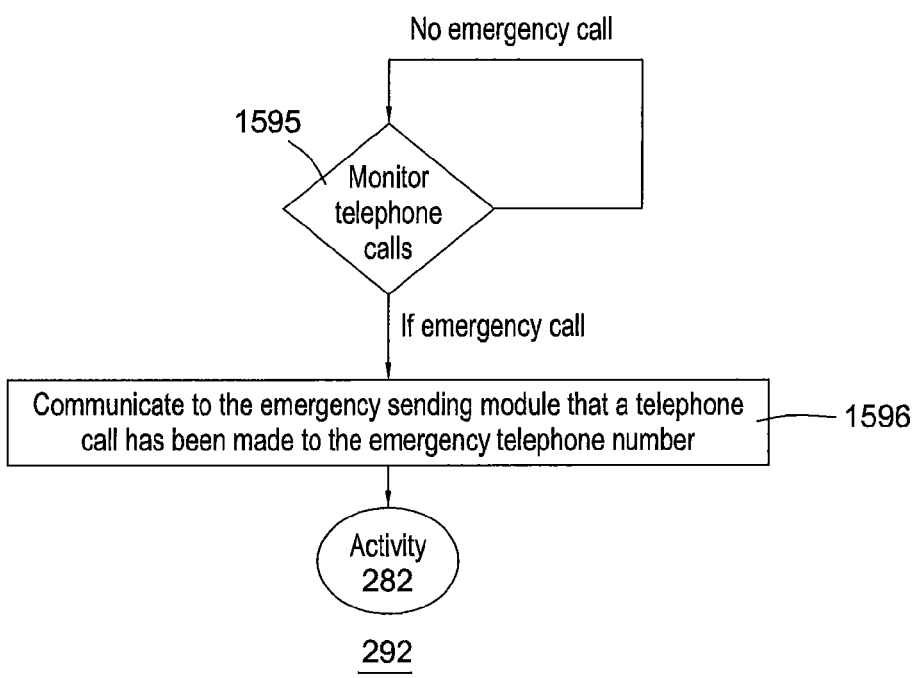
FIG. 15 illustrates a flow chart for an exemplary embodiment of an activity of monitoring telephone communications, according to the first embodiment.

Method 200 also includes an activity 292 of monitoring telephone communications. In some examples, the emergency messaging system can monitor telephone calls made using remote computing device to determine if any telephone calls were made to an emergency number. FIG. 15 illustrates a flow chart for an exemplary embodiment of activity 292 of monitoring telephone communications, according to the first embodiment.

Referring to FIG. 15, activity 292 includes a procedure 1595 of monitoring telephone calls to determine if any telephone calls have been made to an emergency telephone number. In one example, referring to FIG. 1, monitoring module 112 can monitor the telephone call log of storage device 122 to determine if any telephone calls have been made to an emergency telephone number within a predetermined time period (e.g., one, five, ten, or thirty minutes). In another example, monitoring module 112 can monitor the number of outgoing telephone calls when the outgoing telephone call is made to determine if the telephone call is being made to an emergency number.

Activity 292 in FIG. 15 continues with a procedure 1596 of communicating to the emergency sending module that a telephone call has been made to the emergency telephone number. In some examples, the fact that an emergency call was made to an emergency number can be considered receiving an emergency trigger message from the user of the remote computing device. In various embodiments, after procedure 1596, activity 292 is complete, and the next activity is activity 282.

Figure 16:
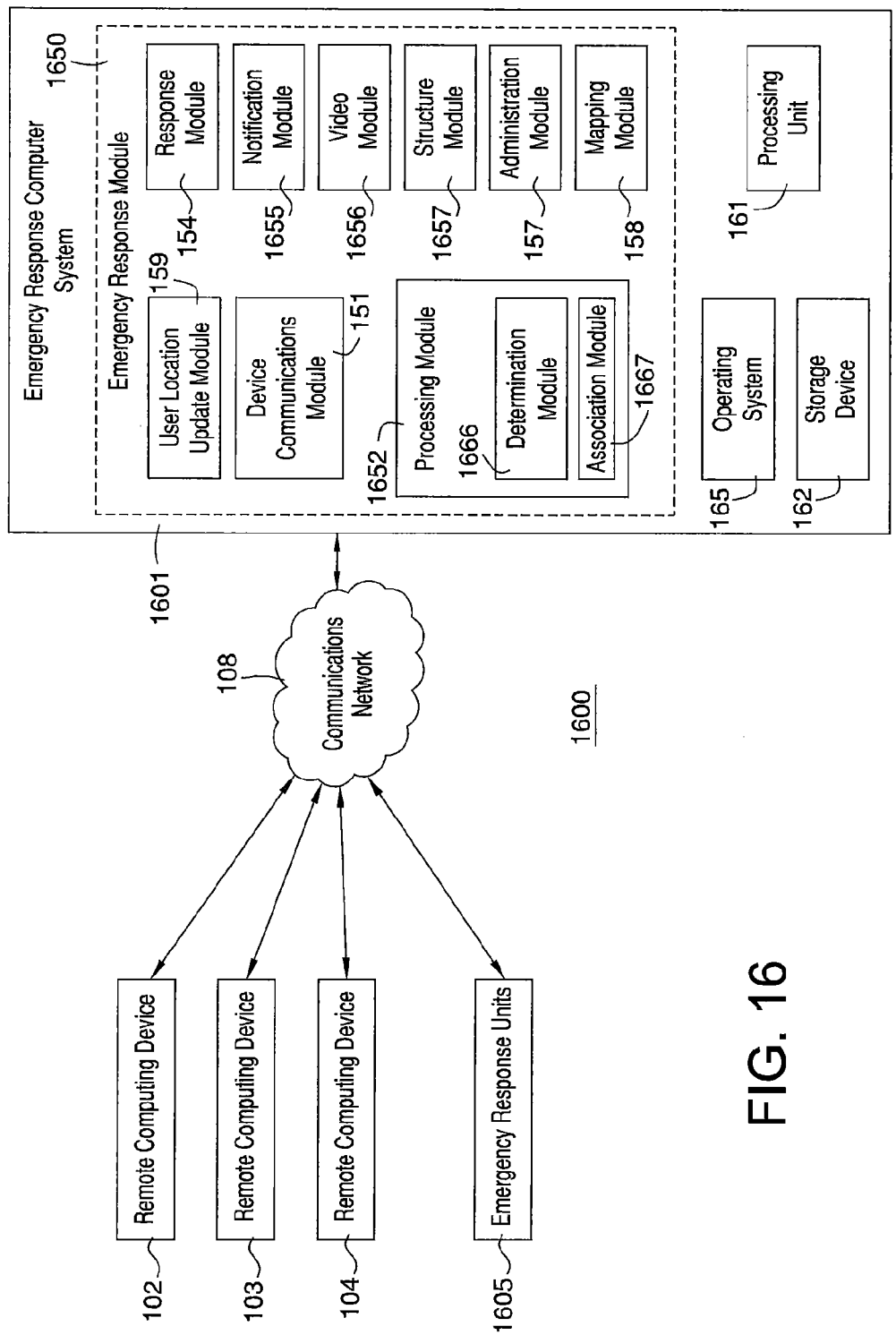
FIG. 16 illustrates a block diagram of an emergency messaging system, according to a second embodiment.

Turning to another embodiment, FIG. 16 illustrates block diagram of an emergency messaging system 1600, according to a second embodiment. Emergency messaging system 1600 is merely exemplary and is not limited to the embodiments presented herein. Emergency messaging system 1600 can be employed in many different embodiments or examples not specifically depicted or described herein.

Emergency messaging system 1600 can be a system configured to dispatch emergency response to a person when the person uses a wireless remote computing device to send an emergency message (e.g., a text message or a telephone call from a wireless device). Current emergency response systems allow a person to call a special number (e.g., 911 in the United States) to be connected to the local emergency response units regardless of location, but current systems are limited in their abilities in the type of communications and the ability to precisely locate the person sending the message. For example, current emergency response systems accept only voice telephone calls to report an emergency. A person currently cannot send a SMS (short message service; i.e., a text) to report an emergency because the telephone carrier infrastructure do not support this capability due to an inability to determine accurately and quickly the location of a sender of an SMS message.

Similarly, current emergency messaging systems' ability to locate a person calling from a wireless device is limited. Current wireless telephone network infrastructures allow only estimates of a location of a wireless device to within 30 meters, which can be inadequate in some situations and locations (e.g., locating an emergency in a high-density urban location).

Emergency messaging system 1600 overcomes these problems of a current emergency messaging system by providing a system that allows users to send emergency messages via text messages and provides a more accurate method of locating the sender of the emergency message.

In some embodiments, emergency messaging system 1600 is designed to allow node type integration for lesser functional users who might not be considered "emergency response unit." In one example, emergency messaging system 1600 could be used by a grade school that does not have emergency response as its primary purpose, but does want to be in the communication stream when an emergency occurs and may have an information communication response obligation to staff, students and/or parents of its students.

In some embodiments, an emergency messaging system 1600 (i.e., a messaging system) can include: (a) a response computer system 1601; (b) two or more remote computing devices 102, 103, and 104; (c) one or more emergency response units 1605. In some examples, response computer system 1601, remote computing devices 102, 103, and 104, and emergency response units 1605 can be configured to communicate using communications network 108.

In other embodiments, emergency messaging system 1600 can be considered to include: (a) an emergency response module 1650 (i.e., a response module) configured to run on processing unit 161 of emergency response computer system 1601; (b) an emergency communications module 110 (i.e., a communications module) configured to run on processing unit 121 of remote computing device 102; (c) an emergency communications module 143 (i.e., a communications module) configured to run on a processing unit of remote computing device 103; and (d) an emergency communications module 144 (i.e., a communications module) configured to run on a processing unit of remote computing device 104.

Emergency response computer system 1601 can include: (a) at least one processing unit 161; (b) emergency response module 1650 (i.e., a response module) configured to run on processing unit 161; (c) a storage device 162; and (d) an operating system 165 configured to run on processing unit 161.

Emergency response units 1605 can include local police departments, fire departments, and local emergency response teams. For example, on a university campus, emergency response units 1605 can be the university police department. In another example, in a city, the emergency response unit can be the city police department, the city fire department, and/or the city's EMT (emergency medical technicians) department. Generally, emergency response units 1605 for a geographic area includes the one or more emergency response units (police, fire, EMT, etc.) responsible for responding to an emergency in the geographic area, regardless of whether the responsible emergency response unit is associated with a city, county, state, province, parish, another political subdivision, university or college, or business. In some examples, emergency response units 1605 include first level response units 105 (FIG. 1). In other examples, emergency response units include first level response units 105 and second level response units 106 (FIG. 1).

In many embodiments, emergency response module 1650 can include: (a) a device communications module 151 configured to receive two or more emergency trigger messages and location information from one or more users via remote computing device 102, 103 or 104; (b) a processing module 1652; (c) a notification module 1655; (d) a video module 1656; (e) a structure module 1657; (f) user location update module 159; (g) administration module 157; and (h) mapping module 158.

Processing module 1652 can be configured to receive the location information of the remote computing device sending the emergency trigger information (the "emergency location") from device communication module 151 and process the emergency location information. In some examples, processing module 1652 can include: (a) a determination module 1666 configured to run on processing unit 161 and further configured to use the location of the remote computing device sending the emergency trigger message to determine an appropriate emergency response unit to notify; and (b) an association module 1667 configured to run on processing unit 161 and further configured to associate one or more locations with one or more emergency response units 1605.

Notification module 1655 can be configured to run on processing unit 161 and further configured to notify the appropriate emergency response unit. In some examples, determination module 1666 can communicate to notification module 1655 the appropriate emergency response unit, and notification module 1655 can forward the emergency trigger message and the location information to the appropriate emergency response unit. If the emergency trigger message is a telephone call, notification module 1655 can immediately forward the telephone call to the appropriate emergency response unit, along with the location information.

Video module 1656 can be configured to run on processing unit 161 and further configured to determine whether a live video feed exists for the emergency location. If live video feed exists for the emergency location, video module 1656 can be configured to provide access to the live video feed for the emergency location to emergency response units 1605. In some examples, video module 1656 can be configured to communicate with police departments, governmental transportation authorities, private video sources, and other sources to have access to their video feeds in case of an emergency event. In many embodiments, video module 1656 can be configured such that video module 1656 accesses information stored in storage device 162 that includes a list of live video feeds available for usage and connection information for these video feeds.

Structure module 1657 can be configured to run on processing unit 161 and further configured to: (a) determine whether a structure exists at the emergency location; (b) determine whether a schematic exist for the structure; and (c) provide access to the schematic of the structure to emergency response unit(s) 1605 if the schematic exists for the structure. In some examples, structure module 1657 can be further configured to provide information about a location of one or more persons in the structure to the emergency response units.

Figure 17:
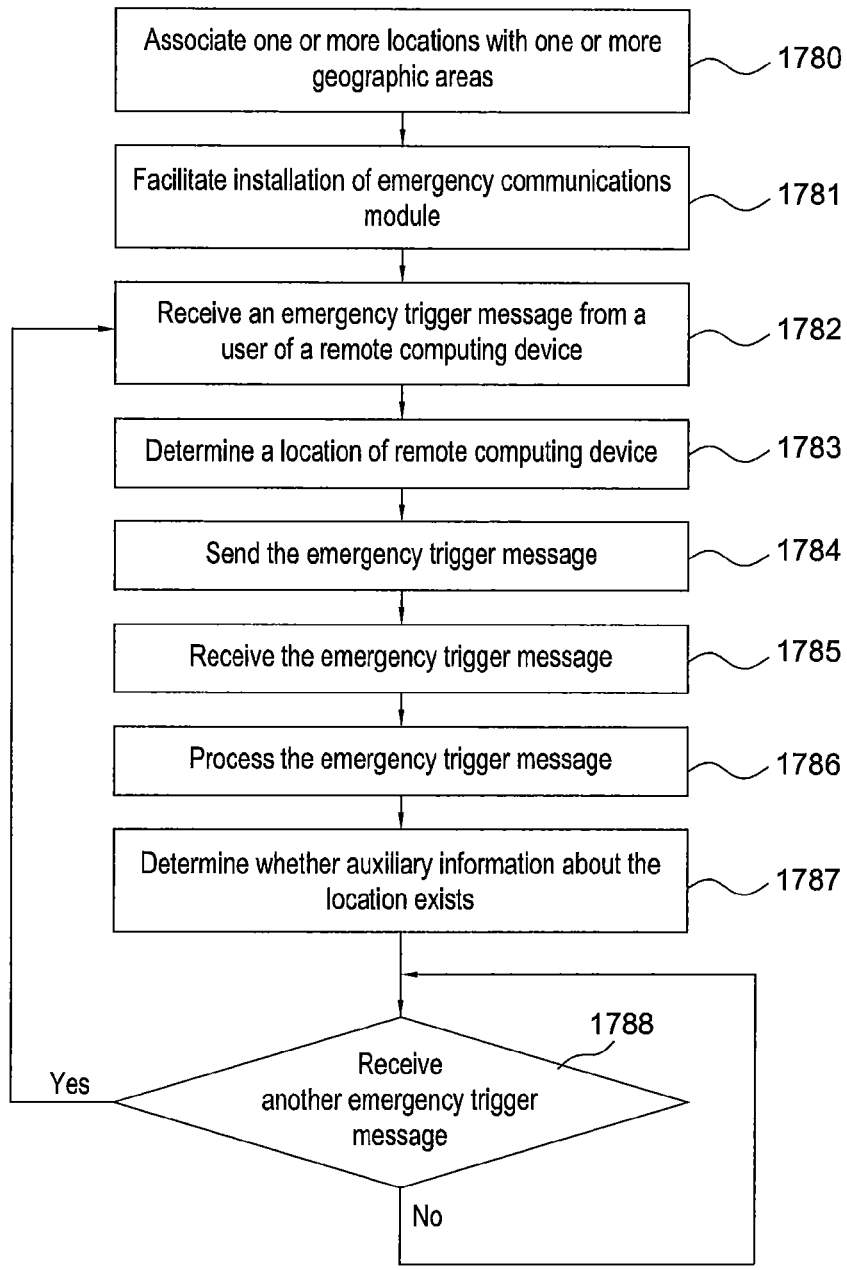
FIG. 17 illustrates a flow chart for an embodiment of a method of responding to an emergency, according to the second embodiment.

FIG. 17 illustrates a flow chart for an embodiment of a method 1700 of responding to an emergency, according to a second embodiment. Method 1700 is merely exemplary and is not limited to the embodiments presented herein. Method 1700 can be employed in many different embodiments or examples not specifically depicted or described herein. In some embodiments, the activities, the procedures, and/or the processes of method 1700 can be performed in the order presented. In other embodiments, the activities, the procedures, and/or the processes of method 1700 can be performed in any other suitable order. In still other embodiments, one or more of the activities, the procedures, and/or the processes in method 1700 can be combined or skipped.

Figure 18:
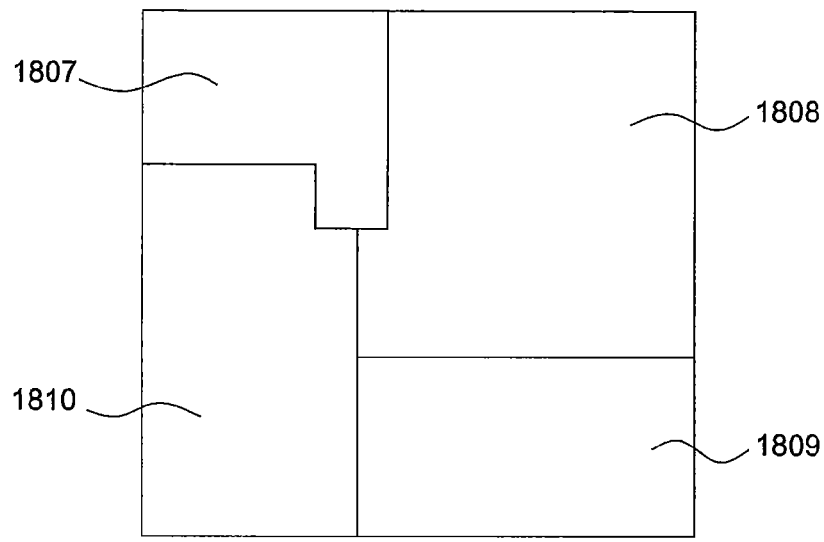
FIG. 18 illustrates an example of a map of a geographic association of locations and emergency response units, according to an embodiment.

Method 1700 of FIG. 17 include an activity 1780 of associating one or more locations with one or more emergency response units. In some examples, association module 1667 (FIG. 16) can associate one or more geographic areas with one or more emergency response units. For example, FIG. 18 illustrates an example of a map 1800 of a geographic association of locations and emergency response units, according to an embodiment. As shown in the map of FIG. 18, different geographic areas 1807, 1808, 1809, and 1810 can be associated with different emergency response units. In the example shown in FIG. 18, a first emergency response unit can be associated with geographical area 1807, a second emergency response unit can be associated with geographical area 1808, a third emergency response unit can be associated with geographical area 1809, and a fourth emergency response unit can be associated with geographical area 1810.

In activity 1780, a user of emergency response computer system 1601 (FIG. 16) can load information regarding the associations into emergency response computer system 1601 (FIG. 16), and association module 1667 (FIG. 16) can create associations between various locations and various emergency response units. In some examples, a user of emergency response computer system 1601 can use a visual mapping tool to load the association data. In other examples, the information can be loaded using different processes.

Next, method 1700 of FIG. 17 includes an activity 1781 of facilitating installation of the emergency communication module on the one or more mobile electrical devices. In some examples, the installation of the emergency communications module can be facilitated by providing the application, providing instructions for installation, and/or providing the application to a third party, who provides the application to the user.

Referring again to FIG. 17, method 1700 includes an activity 1782 of receiving an emergency trigger message from a user of a remote computing device. In some embodiments, the emergency trigger message is received from a user of the remote computing device using an emergency sending module of an emergency communications module. The emergency communications module and emergency sending module can be running on a processor of the remote computing device.

Referring to FIG. 1, for example, a user can activate emergency communications module 110 on remote computing device 102, and emergency sending module 111 can be opened. Emergency sending module 111 can present a user of remote computing device 102 a window on display 131 into which the user can type the emergency trigger message using input device 132. In some examples, the emergency trigger message is a text message, and the user can type the text message into the window of emergency sending module 111. In other examples, the emergency trigger message can be a sound recording, and the user can record the emergency trigger message using input device 132. In other examples, the emergency trigger message can be a telephone call, and the user can initiate the telephone call using input device 132.

Referring again to FIG. 17, method 1700 in FIG. 17 continues with an activity 1783 of determining a location of the remote computing device. In some examples, a location determination module 113 (FIG. 1) can determine the location of remote computing device 102 (FIGS. 1 and 16).

Referring to FIG. 17, for example, after the user submits the emergency trigger message, emergency sending module 111 can request the current location of remote computing device 102 from location determination module 113. In other examples, emergency sending module 111 can request the current location of remote computing device 102 from location determination module 113 when the user activates emergency communications module 110 or when the user begins entering the emergency trigger message into remote computing device 102. After location determination module 113 determines the location, location determination module 113 can communicate the location to emergency sending module 111. In various embodiments, location determination module 113 can determine the location of remote computing device 102 at predetermined intervals (e.g., ten seconds, one minute, ten minutes, and one hour intervals).

Referring back to FIG. 17, method 1700 includes an activity 1784 of sending the emergency trigger message to the emergency response computer system. In some examples, sending the emergency trigger message can include sending an audio recording or text message with the location to the response computer system using the emergency module. In other examples, sending the emergency trigger message can include a telephone call to a human operator in communication with response computer system 101.

Referring to FIG. 1, for example, after the user submits the emergency trigger message and emergency sending module 111 receives the current location information from location determination module 113, emergency sending module 111 sends the emergency trigger message and the current location information to device communications module 151 over communications network 108. In other examples, if emergency sending module 111 does not receive (or location determination module cannot determine) the current location information within a predetermined period of time (e.g., 1, 5, 10, or 30 seconds), emergency sending module 111 can send the emergency trigger message to device communications module 151 without the current location information. In the examples where the current location information is not available, emergency sending module 111 can send the most recent location information available along with the timestamp for the location information. Furthermore, when the current location information is not available, emergency sending module 111 can send the information as soon as it becomes available.

Next, method 1700 of FIG. 17 includes an activity 1785 of receiving the emergency trigger message from the remote computing device. In some examples, the emergency response computer system can receive emergency trigger messages from the users via two or more remote computing devices.

In some examples, receiving the emergency trigger message can include receiving a text message from the user of the remote computing device. In various embodiments, receiving the emergency trigger message further can include receiving an audio recording. The audio recording can be a recording made by a user of a remote computing device. In still another example, receiving the emergency trigger message can include receiving a telephone call from the user of the remote computing device.

Figure 19:
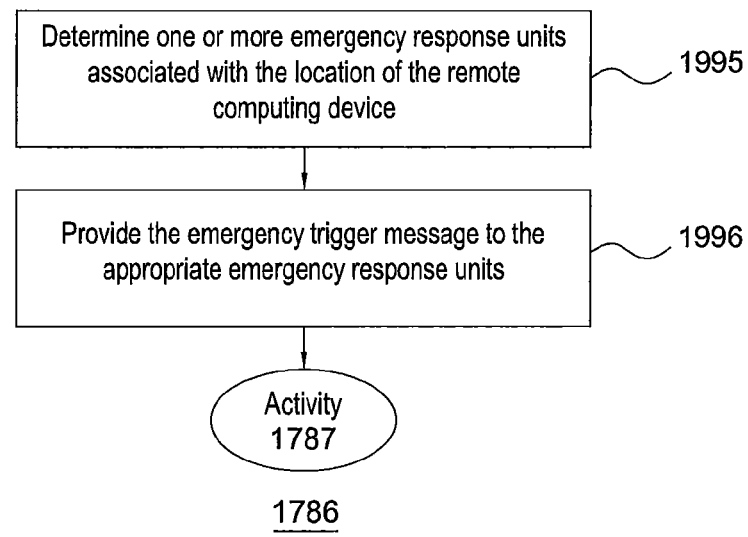
FIG. 19 illustrates a flow chart for an exemplary embodiment of an activity of processing the emergency trigger messages, according to the second embodiment.

Method 1700 in FIG. 17 continues with an activity 1786 of processing the emergency trigger message. FIG. 19 illustrates a flow chart for an exemplary embodiment of activity 1785 of processing the emergency trigger messages, according to the second embodiment.

Referring to FIG. 19, activity 1786 includes a procedure 1995 of determining one or more emergency response units associated with the location of the remote computing device (i.e., the emergency location). In various embodiments, determination module 1666 (FIG. 16) can determine the emergency response units associated with the emergency location. For example, determination module 1666 can access the association databases stored in storage device 162, which were created in activity 1780 (FIG. 17), to determine the emergency response units associated with the emergency location.

In various examples, if the remote computing device is transmitting in its location at predetermined intervals, determination module 1666 can determine when emergency response module 150 (FIG. 1) receives the new location information what emergency response units are associated with the remote computing device's current location and store that information in a database of storage device 162. For example, if a remote computing device moves from geographical area 1807 (FIG. 18) to geographical area 1808 (FIG. 18), determination module 1666 can change the emergency response unit associated with the remote computing device from the first emergency response unit to the second emergency response unit. In the same or different examples, device communications module 151 (FIG. 1) can communicate to the remote computing device that identity of the emergency response units when the emergency response unit associated with the remote computing device's location change.

Subsequently, activity 1786 includes procedure 1996 of providing the emergency trigger message to the appropriate one or more emergency response units. In some examples, determination module 1666 (FIG. 16) can communicate the appropriate emergency response units to notification module 1655. Notification module 1655 can provide the emergency trigger message along with the location information to the appropriate response units. In many examples, procedure 1996 can be similar or the same as activity 291 and/or 288 of FIG. 2. After procedure 1996, activity 1786 is complete.

Figure 20:
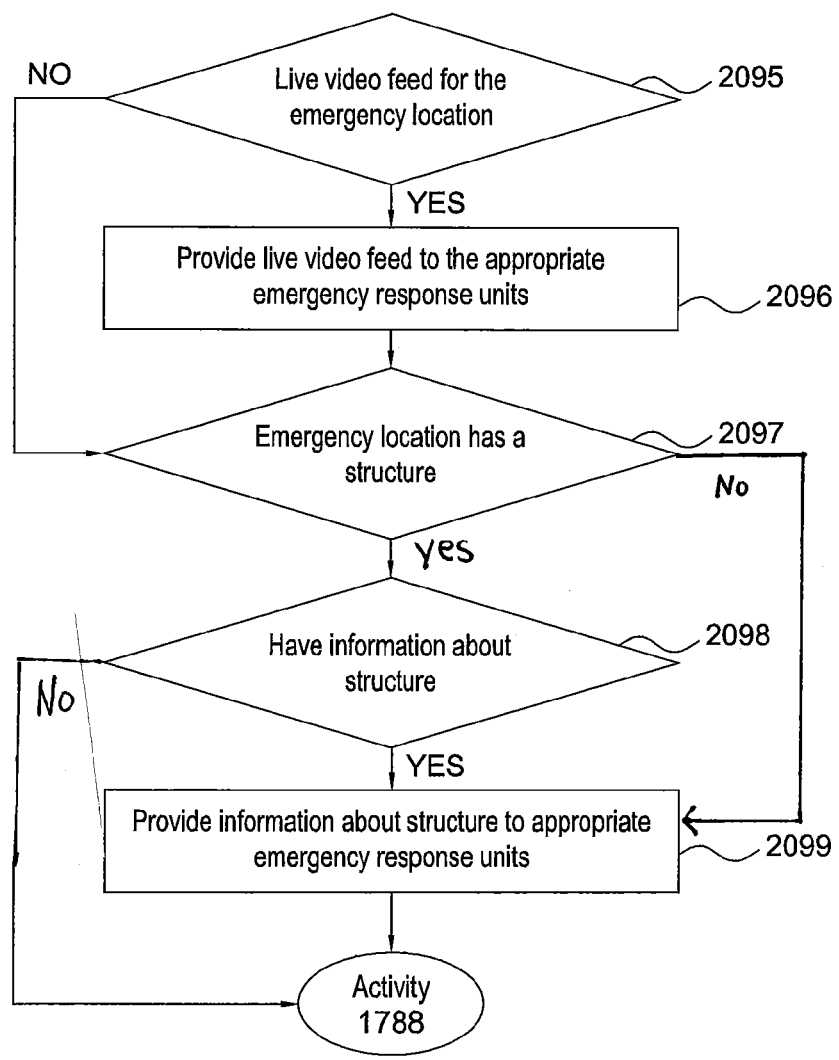
FIG. 20 illustrates a flow chart for an exemplary embodiment of an activity of determining whether auxiliary information about the emergency location exists, according to the second embodiment.

Referring again to FIG. 17, method 1700 continues with an activity 1787 of determining whether auxiliary information about the emergency location exists. FIG. 20 illustrates a flow chart for an exemplary embodiment of activity 1787 of whether auxiliary information about the emergency location exists, according to the second embodiment.

Referring to FIG. 19, activity 1787 includes a procedure 2095 of determining whether a live video feed exists for the emergency location. In some examples, video module 1656 (FIG. 16) can query the databases stored in storage device 162 (FIGS. 1 & 16) to determine whether a live video feed exists for the emergency location. For example, video module 1656 (FIG. 16) can then determine whether there are any geo-fenced video cameras accessible for that location by cross-referencing the emergency location with geo-fenced camera IP address feeds. If a live video feed exists, the next procedure in activity 1787 is a procedure 2096. If a live video feed does not exist, the next procedure is a procedure 2097.

If a live video feed exists, procedure 2096 of activity 1787 is performed and involves providing the live video feed to the appropriate emergency response units. For example, video module 1656 (FIG. 16) can allow the appropriate emergency response unit to access the video feed through tactical emergency management interface and captured in an event log with the call. The tactical emergency management interface of video module 1656 (FIG. 16) can allow a member of the emergency response unit to draw a polygon onto a GPS integrated map to overlay a video camera field of vision "footprint" in order to allow automatic access of the video camera feed in a tactical emergency management interface.

Activity 1787 of FIG. 20 includes a procedure 2097 of determining whether a structure exists at the emergency location. In some examples, structure module 1657 (FIG. 16) can query the databases stored in storage device 162 (FIGS. 1 & 16) to determine whether a structure exists for the emergency location. For example, video module 1656 can then determine whether there are any geo-fenced video cameras accessible for that location by cross-referencing the emergency location with geo-fenced camera IP address feeds. If a structure does not exist at the emergency location, the next activity is activity 2099.

If a structure exists at the emergency location, activity 1787 of FIG. 20 includes a procedure 2098 of determining whether any information about the structure is available. For example, structure module 1657 (FIG. 16) can determine whether there are any geo-fenced building schematics accessible for the emergency location by cross-referencing the emergency location with geo-fenced building schematic feeds. In the same or different example, structure module 1657 (FIG. 16) can query the databases stored in storage device 162 (FIGS. 1 & 16) to determine whether information about the structure at the emergency location exists. If no information about the structure is available, then activity 1787 is complete and the next activity is activity 1788.

If information about the structure is available, activity 1787 of FIG. 20 includes a procedure 2099 of providing the information about the structure to the appropriate emergency response units. In some examples, structure module 1657 (FIG. 16) can provide various types of information about the structure to the appropriate emergency response units.

Referring to FIG. 16, in some embodiments, structure module 1657 can provide building schematics of the structure to the appropriate emergency response units. For example, structure module 1657 can allow a member of an emergency response unit to draw a polygon onto a GPS integrated map to overlay a building's two-dimensional footprint in order to allow automatic access of the schematic into a tactical emergency management interface of structure module 1657.

In the same or different embodiments, structure module 1657 can determine whether any individuals are in the structure and their locations. For example, structure module 1657 can access a database in storage device 162 that includes information regarding the locations of remote computing devices 102, 103, and 104. Structure module 1657 can determine whether any of remote computing devices 102, 103, or 104 are located in the structure at the emergency location. In various examples, structure module 1657 can plot the locations of any remote computing devices, which are located in the structure, into a building schematic. Structure module 1657 can allow a member of the emergency response unit to draw a polygon onto a GPS integrated map to overlay a building's three-dimensional "schematic" in order to allow automatic access of the schematic into a tactical emergency management interface, with locations of individuals plotted into the schematic using the appropriate X, Y, and Z axis information.

In still the same or a different embodiment, structure module 1657 can provide automatic first responder assistance. For example, structure module 1657 can use specific user locations within a building schematic to trigger predefined ingress/egress/evacuation plans and provide these to appropriate emergency response units. Ingress, egress, tactical planning and other emergency responder information associated locations within a building schematic can be stored in storage device 162. By defining target locations within the building schematic, structure module 1657 can provide instructions for ingress, egress, potential hazards, and scenario specific alternatives. In other embodiments, structure module 1657 can provide other information about the structure at the emergency location to the appropriate emergency response units. After procedure 2099 (FIG. 17), activity 1787 is complete.

Referring again to FIG. 17, the next activity in method 1700 of FIG. 17 is an activity 1788 of determining whether another emergency trigger message has been received. If another emergency trigger message is received, the next activity is activity 1782. If no emergency message is received, activity 1788 is repeated.

Figure 21:
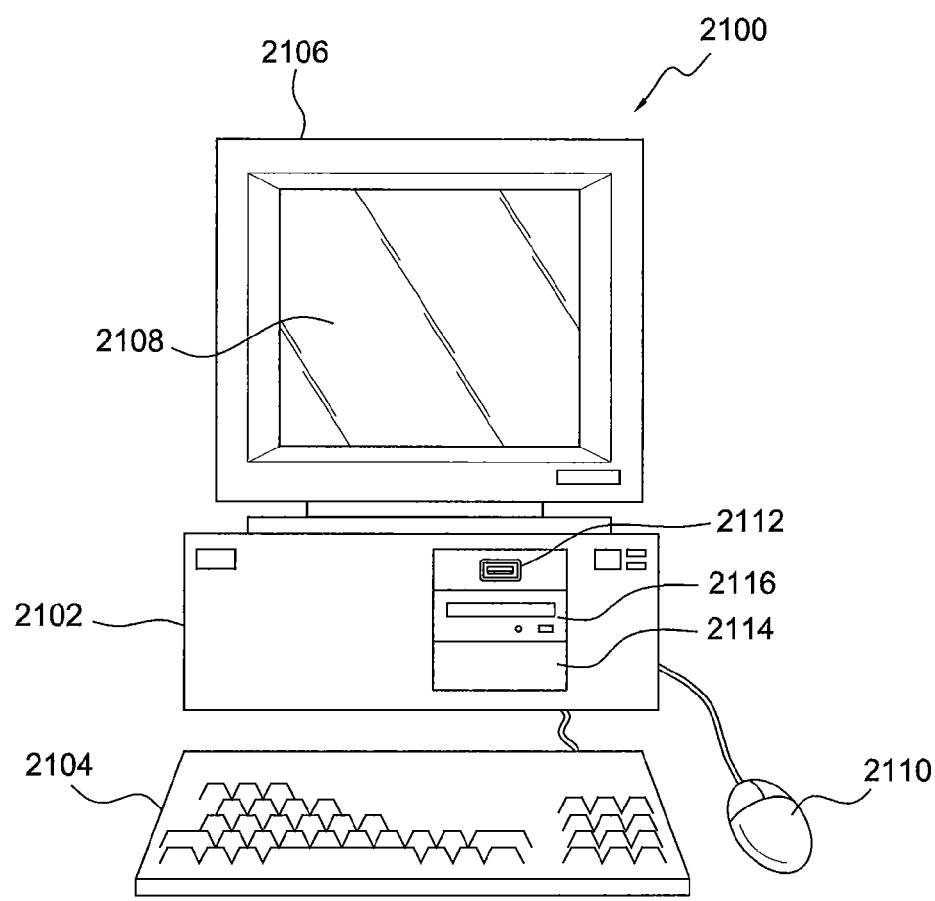
FIG. 21 illustrates a computer that is suitable for implementing an embodiment of emergency messaging system of FIG. 1.
Figure 22:
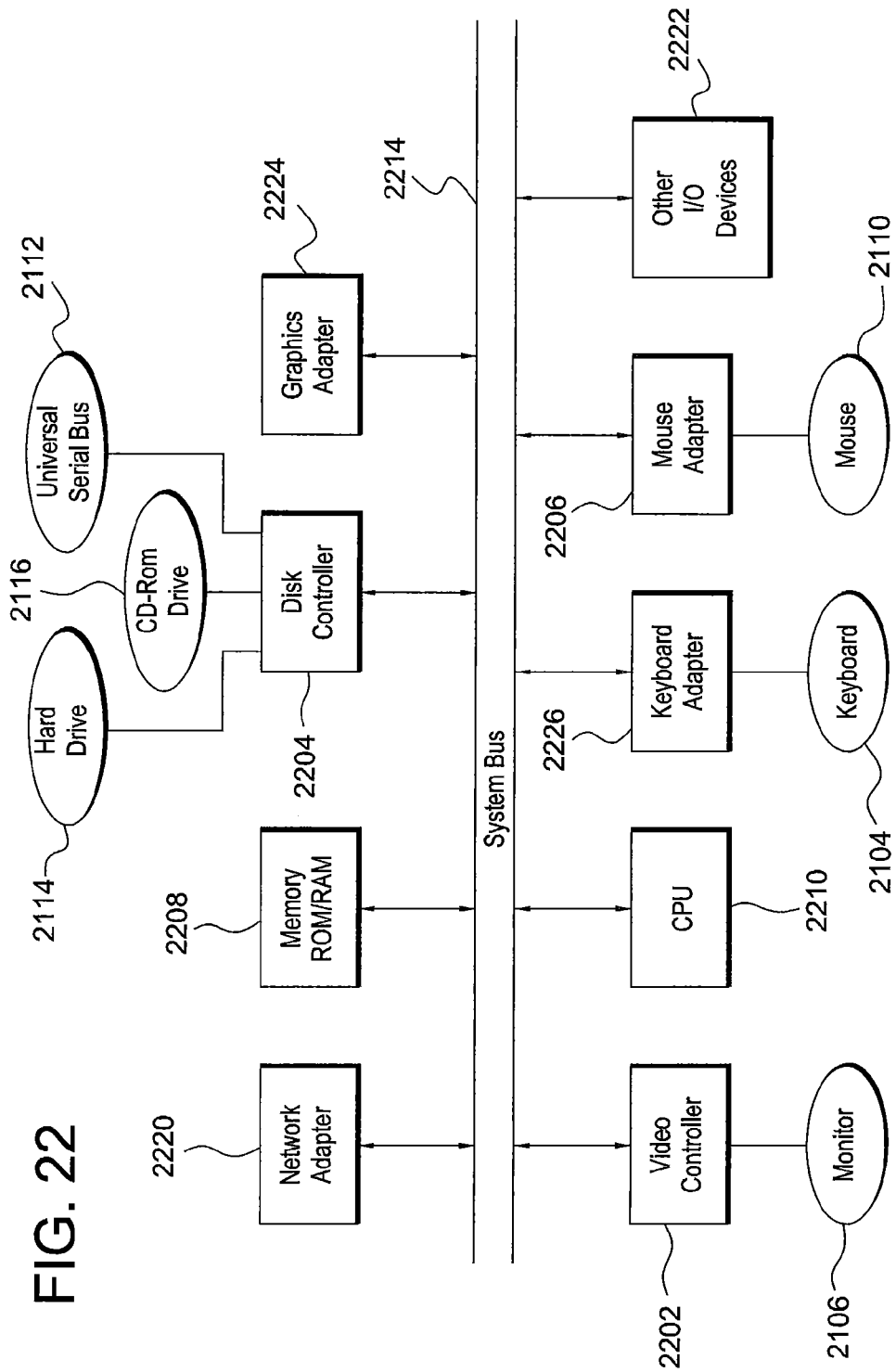
FIG. 22 illustrates a representative block diagram of an example of the elements included in the circuit boards inside chassis of the computer of FIG. 21.

FIG. 21 illustrates a computer 2100 that is suitable for implementing an embodiment of at least a portion of response computer system 101 (FIG. 1). Computer 2100 includes a chassis 2102 containing one or more circuit boards (not shown), a USB (universal serial bus) port 2112, a Compact Disc Read-Only Memory (CD-ROM) and/or Digital Video Disc (DVD) drive 2116, and a hard drive 2114. A representative block diagram of the elements included on the circuit boards inside chassis 2102 is shown in FIG. 22. A central processing unit (CPU) 2210 in FIG. 22 is coupled to a system bus 2214 in FIG. 22. In various embodiments, the architecture of CPU 2210 can be compliant with any of a variety of commercially distributed architecture families.

System bus 2214 also is coupled to memory 2208 that includes both read only memory (ROM) and random access memory (RAM). Non-volatile portions of memory 2208 or the ROM can be encoded with a boot code sequence suitable for restoring computer 2100 (FIG. 21) to a functional state after a system reset. In addition, memory 2208 can include microcode such as a Basic Input-Output System (BIOS). In some examples, storage device 162 (FIG. 1) can include memory 2208, USB drive 2112, hard drive 2114, and/or CD-ROM or DVD drive 2116.

In the depicted embodiment of FIG. 22, various I/O devices such as a disk controller 2204, a graphics adapter 2224, a video controller 2202, a keyboard adapter 2226, a mouse adapter 2206, a network adapter 2220, and other I/O devices 2222 can be coupled to system bus 2214. Keyboard adapter 2226 and mouse adapter 2206 are coupled to a keyboard 2104 (FIGS. 21 and 22) and a mouse 2110 (FIGS. 21 and 22), respectively, of computer 2100 (FIG. 21). While graphics adapter 2224 and video controller 2202 are indicated as distinct units in FIG. 22, video controller 2202 can be integrated into graphics adapter 2224, or vice versa in other embodiments. Video controller 2202 is suitable for refreshing a monitor 2106 (FIGS. 21 and 22) to display images on a screen 2108 (FIG. 21) of computer 2100 (FIG. 21). Disk controller 2204 can control hard drive 2114 (FIGS. 21 and 22), floppy disc drive 2112 (FIGS. 21 and 22), and CD-ROM or DVD drive 2116 (FIGS. 21 and 22). In other embodiments, distinct units can be used to control each of these devices separately.

Network adapters 2220 can be coupled to one or more antennas. In some embodiments, network adapter 2220 is part of a WNIC (wireless network interface controller) card (not shown) plugged or coupled to an expansion port (not shown) in computer 2100. In other embodiments, the WNIC card can be a wireless network card built into internal computer 2100. A wireless network adapter can be built into internal client computer 2100 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 2220 can be a wired network adapter.

Although many other components of computer 2100 (FIG. 21) are not shown, such components and their inter-connection are well known to those of ordinary skill in the art. Accordingly, further details concerning the construction and composition of computer 2100 and the circuit boards inside chassis 2102 (FIG. 21) need not be discussed herein.

When computer 2100 in FIG. 21 is running, program instructions stored on a USB drive in USB port 2112, on a CD-ROM or DVD in CD-ROM and/or DVD drive 2116, on hard drive 2114, or in memory 2208 (FIG. 22) are executed by CPU 2210 (FIG. 22). A portion of the program instructions, stored on these devices, can be suitable for carrying out method 200 (FIG. 2) and/or method 1700 of FIG. 17 as described previously with respect to FIGS. 1-20.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that parts of method 200 of FIG. 2 and 1700 of FIG. 17 and may be comprised of many different activities, procedures and be performed by many different modules, in many different orders; that any element of FIG. 1 may be modified; and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of providing emergency response services to one or more users of one or mobile electrical devices in operative communication with an emergency response computer system, the method comprising:
   facilitating a use of a first mobile electrical device to send a first trigger message, wherein facilitating the use of the first mobile electrical device to send the trigger message comprises:
     receiving a first location of the first mobile electrical device from a global positioning module, the global positioning module running on the first mobile electrical device;
     receiving the first trigger message from a user of the first mobile electrical device; and
     wirelessly transmitting the first trigger message and the first location of the first mobile electrical device to a response module running on a processor of a first server;

receiving the first location and the first trigger message in the response module running on the processor of the first server;

analyzing the first trigger message in the processor of the first server for a first trigger word corresponding to a first emergency situation;

determining in the processor an appropriate emergency group from a set of emergency groups, wherein the set of emergency groups is comprised of a police department, a fire department, and an emergency medical service, wherein each one of the emergency groups comprises a plurality of emergency response units, and wherein the processor selects the appropriate emergency group from the set of emergency groups according to the first trigger word in the first trigger message;

receiving in the processor a set of response unit locations corresponding with the emergency response units in each one of the emergency groups;

determining in the processor a first response unit from the plurality of emergency response units in the appropriate emergency group selected by the processor, wherein the first response unit has a second location within the set of response unit locations, wherein the processor selects the first response unit according to its relationship within the appropriate emergency group and the second location of the first response unit being associated with the first location of the first mobile electrical device;

setting a mass event trigger limit, wherein the mass event trigger limit is comprised of a defined number of trigger messages received with a defined set of trigger words in a defined period of time from a set of locations within a defined distance from each other;

analyzing in the processor a plurality of trigger messages relative to each other to confirm that the mass event trigger limit has been reached;

initiating a mass event warning from the response module when the mass event trigger limit has been reached;

receiving the set of locations and a corresponding set of trigger messages in the response module for a plurality of users with a plurality of mobile electrical devices;

analyzing the trigger messages in the processor for a set of trigger words corresponding to a set of emergency situations, wherein the set of emergency situations includes the first emergency situation and at least a second emergency situation;

determining a relationship between a subset of the set of emergency situations in the processor, wherein the relationship between the subset of emergency situations is comprised of a correlation between the trigger words for a subset of the set of trigger messages received within a predetermined time period from a subset of the set of locations within a predetermined distance from the first location;

elevating an emergency level from a first level to a second level when the relationship between the subset of the set of emergency situations is determined to exist;

determining in the processor a second response unit from the plurality of emergency response units in the appropriate emergency group selected by the processor when the emergency level is elevated from the first level to the second level;

transmitting the first location corresponding with the first mobile electrical device and the first emergency situation associated with the first trigger message to the first response unit; and transmitting the first location corresponding with the first mobile electrical device and the first emergency situation associated with the first trigger message to the second response unit.

2. The method of claim 1, further comprising:

before using the first mobile electrical device to send the trigger message, associating in a database the first location of the first mobile electrical device with the first response unit and associating in the database the set of emergency groups with a set of trigger messages; and after receiving the first trigger message, providing an emergency system operator with the first location, the first response unit, and the first emergency situation while transmitting the first location and the first emergency situation to the first response unit, wherein the emergency system operator is in operative communication with the emergency response computer system.

3. The method of claim 2, further comprising:

before using the first mobile electrical device to send the first trigger message, associating in the database the set of response unit locations with the emergency response units; and after receiving the first trigger message, immediately transmitting the first location and the first emergency situation to the first response unit, and simultaneously transmitting the first location and the first emergency situation to at least one additional response unit in addition to the first response unit.

4. The method of claim 1, further comprising:

storing a set of trigger words in the database, wherein the set of trigger words comprises the first trigger word, a second trigger word, and at least one additional trigger word, associating the first location with the first response unit comprises:
determining a first geographic area serviced by the first response unit; and
associating in the database the first geographic area with the first response unit;

wherein:
the first geographic area comprises the first location.

5. The method of claim 1, further comprising:

after receiving the first trigger message in the response module, determining whether a live video feed exists for the first location; and providing access to the live video feed for the first location simultaneously to an emergency system operator and the first response unit through a video module in operative communication with the processor.

6. The method of claim 1, further comprising:

after receiving the first trigger message, determining whether a structure is located at the first location;

receiving specific location information about a person in the structure;

providing to the first response unit the specific location information about the person in the structure;

determining whether a schematic exist for the structure when the structure is located at the first location; and providing access to the schematic of the structure to the first response unit when the schematic exists for the structure.

7. The method of claim 1, wherein the step for facilitating the use of the first mobile electrical device to send the first trigger message is further comprised of the steps of:

creating a set of predetermined trigger words;
providing the first mobile electrical device with a mobile emergency communications module with the set of predetermined trigger words, wherein the first mobile electrical device is comprised of a processing unit, a storage device, a touchscreen display, and a mobile phone;
storing the mobile emergency communications module with the set of predetermined trigger words on the storage device;
operating the mobile emergency communications module on the processing unit;
showing at least a subset of the set of predetermined trigger words on the touchscreen display; and
producing with the processing unit the first trigger message with one of the predetermined trigger words that the user selects with the touchscreen display.

8. The method of claim 7, wherein the showing step further comprises the steps of:
defining the subset of the set of predetermined trigger words with at least one of a set of icons and a set of terms corresponding to police, fire, and at least one of ambulance, EMT, medical emergency, and 911; and
showing the at least one of a set of icons and a set of terms on a respective set of touchscreen buttons on the touchscreen display.

9. The method of claim 6, wherein the step for analyzing the first trigger message in the processor is further comprised of identifying the one of the predetermined trigger words selected by the user as the first trigger word.

10. The method of claim 1, wherein the first trigger message is comprised of at least one of a predetermined trigger word, a typed-word message, a notification of an emergency telephone call, and a voice-recorded message, wherein the step for analyzing the first trigger message in the processor is further comprised of at least one of the steps of identifying the predetermined trigger word as the first trigger word, setting the notification to be the first trigger word, transcribing in the processor the voice-recorded message into a text message, and determining in the processor whether at least one of the text message and the typed-word message contain the first trigger word, and wherein the set of emergency groups is further comprised of a custom named group.

11. The method of claim 1, further comprising:
initiating an emergency call from the user through the first mobile electrical device to an emergency operator in communication with the response module running on the processor of the first server, wherein the emergency operator receives the emergency call from the user and retrieves the first trigger message of the user from the response module, wherein the emergency operator has communication channels available for the plurality of emergency response units, and wherein the emergency operator is in operative communication with the first response unit.

12. The method of claim 1, further comprising:
receiving the first location of the first mobile electrical device in the response module before using the mobile electrical device to send the first trigger message; and
storing the first location of the first mobile electrical device in a storage device.

13. The method of claim 1, wherein:
the first trigger message comprises a text message, and wherein the step for analyzing the first trigger message in the processor is further comprised of identifying the first trigger word in the text message.

14. The method of claim 1, wherein:
the first trigger message comprises a telephone call, and wherein the step for analyzing the first trigger message in the processor is further comprised of transcribing in the processor the telephone call into a text message, and identifying the first trigger word in the text message.

15. An emergency messaging system configured to be used with two or more mobile electrical devices, the emergency messaging system comprising:
a device communications module configured to run on at least one first processor and further configured to communicate with the two or more mobile electrical devices, the device communications module further configured to receive a first trigger message from a user of a first one of the two or more mobile electrical devices, the first trigger message comprises a first trigger word and a first location of the first one of the two or more mobile electrical devices;
an emergency response module configured to run on the at least one first processor to process the first trigger word in the first trigger message to determine a first emergency situation having an emergency level;
a determination module configured to:
run on the at least one first processor,
determine an appropriate emergency group from a set of emergency groups, wherein the set of emergency groups is comprised of a police department, a fire department, and an emergency medical service, wherein each one of the emergency groups comprises a plurality of emergency response units, and wherein the at least one first processor selects the appropriate emergency group from the set of emergency groups according to the first trigger word in the first trigger message, and
determine a first appropriate emergency response unit in the appropriate emergency group based on the first emergency situation and the first location of the first one of the two or more mobile electrical devices; and
a notification module configured to run on the at least one first processor and further configured to receive information regarding the first appropriate emergency response unit and notify the first appropriate emergency response unit of the first location associated and the first emergency situation corresponding to the first trigger message;
wherein a mass event trigger limit is set in the emergency response module, wherein the mass event trigger limit is comprised of a defined number of trigger messages received with a defined set of trigger words in a defined period of time from a set of locations within a defined distance from each other;
wherein the determination module analyzes in the at least one first processor a plurality of trigger messages relative to each other to confirm that the mass event trigger limit has been reached;
wherein the emergency response module initiates a mass event warning when the mass event trigger limit has been reached;
wherein the emergency response module receives the set of locations and a corresponding set of trigger messages for a plurality of users with a plurality of mobile electrical devices;
wherein the determination module analyzes the trigger messages in the at least one first processor for a set of trigger words corresponding to a set of emergency situations, wherein the set of emergency situations includes the first emergency situation and at least a second emergency situation;
wherein the determination module determines a relationship between a subset of the set of emergency situations in the at least one first processor, wherein the relationship between the subset of emergency situations is comprised of a correlation between the trigger words for a subset of the set of trigger messages received within a predetermined time period from a subset of the set of locations within a predetermined distance from the first location;
wherein the determination module elevates an emergency level from a first level to a second level when the relationship between the subset of the set of emergency situations is determined to exist;
wherein the determination module determines in the at least one first processor a second appropriate response unit from the plurality of emergency response units in the appropriate emergency group selected by the at least one first processor when the emergency level is elevated from the first level to the second level; and
wherein the notification module transmits the first location corresponding with the first mobile electrical device and the first emergency situation associated with the first trigger message to the second appropriate response unit.

16. The emergency messaging system of claim 15, further comprising:
an emergency communications module configured to run on at least one second processor and further configured to send the first trigger message and the first location to the device communications module;
an emergency sending module configured to run on the at least one second processor and further configured to create the first trigger message with at least one of a predetermined trigger word, a typed-word message, a notification of an emergency telephone call, and a voice-recorded message; and
a location determination module configured to run on the at least one second processor and further configured to determine the location information of the first one of the two or more mobile electrical devices and communicate the location information to the emergency communications module, wherein:
the first one of the two mobile electrical devices comprises the emergency communications module, the emergency sending module, the location determination module, and the at least one second processor.

17. The emergency messaging system of claim 15, further comprising:
an association module configured to run on the at least one first processor and further configured to associate one or more locations with one or more emergency response units;
the one or more locations comprise the location of the first one of the two or more mobile electrical devices; and
the one or more emergency response units comprise the first emergency response unit.

18. The emergency messaging system of claim 15, further comprising:
a video module configured to run on the at least one first processor and further configured to determine whether a live video feed exists for the first location and provide access to the live video feed to the first emergency response unit when the live video feed exists for the first location.

19. The emergency messaging system of claim 15, wherein the mobile electrical devices each further comprise:
a user control module having a touchscreen, wherein a set of emergency message buttons are displayed on the touchscreen, wherein a set of predetermined trigger words are respectively associated with the set of emergency message buttons, and wherein a selection of one of the emergency message buttons corresponds with one of the predetermined trigger words; and
a second processor running an emergency communications module, an emergency sending module, and a location determination module, wherein the sending module creates the first trigger message with the corresponding one of the predetermined trigger words, wherein the location determination module determines the first location using location information from one of the mobile electrical devices corresponding with the selection of one of the emergency message buttons, and wherein the emergency communications module sends the first trigger message and the first location to the device communications module.

20. The emergency messaging system of claim 19, wherein the set of emergency message buttons have a set of icons corresponding with police, fire, and ambulance, and wherein the predetermined trigger words are a set of terms respectively corresponding with police, fire, and ambulance.

21. The emergency messaging system of claim 15, wherein:
the first trigger message comprises a text message, wherein the determination module is further configured to identify the first trigger word in the text message, and wherein the notification module provides an emergency system operator with the appropriate emergency response unit, the first location, the first emergency situation, and the emergency level while notifying the appropriate emergency response unit of the first location and the first emergency situation, wherein the emergency system operator is in operative communication with the notification module, and wherein the set of emergency groups is further comprised of a custom named group.

22. The emergency messaging system of claim 15, wherein:
the first trigger message comprises a telephone call, wherein the determination module is further configured to transcribe the telephone call into a text message and to identify the first trigger word in the text message, wherein the notification module provides an emergency system operator with the appropriate emergency response unit, the first location, the first emergency situation, and the emergency level while notifying the appropriate emergency response unit of the first location and the first emergency situation, and wherein the emergency system operator is in operative communication with the notification module.

23. A method of responding to an emergency using an emergency response computer system, the emergency response computer system comprising at least one processing unit and an emergency response module, the method comprising:
setting a mass event trigger limit in the emergency response module, wherein the mass event trigger limit is comprised of a defined number of trigger messages received with a defined set of trigger words in a defined period of time from a set of locations within a defined distance from each other;

receiving in the emergency response module the set of locations and a corresponding set of emergency trigger messages from a plurality of users with a plurality of remote computing devices, the emergency response module running on the at least one processing unit;

using the emergency response module to process the one or more emergency trigger messages to determine an emergency level, wherein using the emergency response module to process the one or more emergency trigger messages comprises:

determining the set of locations of at least a portion of the one or more remote computing devices, wherein the set of locations is comprised of at least a first location and a second location, wherein the first location corresponds to a first remote computing device and a first emergency trigger message, and wherein the second location corresponds to a second remote computing device and a second emergency trigger message;

analyzing the one or more emergency trigger messages to determine a content of the one or more emergency trigger messages, wherein the content is evaluated for a set of trigger words corresponding to a set of emergency situations, wherein the set of emergency situations includes a first emergency situation and at least a second emergency situation;

analyzing the emergency trigger messages relative to each other to confirm that the mass event trigger limit has been reached;

initiating a mass event warning when the mass event trigger limit has been reached;

determining a relationship between a subset of the set of emergency situations, wherein the relationship between the subset of emergency situations is comprised of a correlation between the trigger words for a subset of the set of trigger messages received within a predetermined time period from a subset of the set of locations within a predetermined distance from the first location;

determining a level of response to the one or more emergency trigger messages based upon locations of the at least the portion of the one or more remote computing devices and the content of the one or more emergency trigger messages, the levels of response comprise a first level response and a second level response;

elevating an emergency level from the first level to the second level when the relationship between the subset of the set of emergency situations is determined to exist;

using the locations of the at least the portion of the one or more remote computing devices to determine a first response unit to notify;

using the locations of the at least the portion of the one or more remote computing devices to determine a second response unit to notify when the level of response is the second level of response;

using the emergency response module to notify the first response unit of the locations of the at least the portion of the one or more remote computing devices when the level of response is the first level of response or the second level of response while providing an emergency system operator with the first response unit, the locations of the at least the portion of the one or more remote computing devices, and the level of response, wherein the first location corresponding with the first remote computing device and the first emergency situation associated with the first trigger message is transmitted to the first response unit for the first level response;

using the emergency response module to simultaneously notify the first response unit and the second response unit of the locations of the at least the portion of the one or more remote computing devices when the level of response is the second level of response, wherein the first location corresponding with the first remote computing device and the first emergency situation associated with the first trigger message is transmitted to at least the first response unit according to the second level of response, and wherein the second location corresponding with the second remote computing device and the second emergency situation associated with the second trigger message is transmitted to the first response unit and to the second response unit according to the second level of response;

receiving in the emergency response module instructions from the second response unit to notify a target group when the level of response is the second level of response; and using the emergency response module to send a first emergency alert message to the target group when the level of response is the second level of response.

24. The method of claim 23, wherein the one or more emergency trigger messages comprise one or more text messages, wherein the content of the one or more emergency trigger messages is comprised of a predetermined trigger word within the one or more text messages, and wherein the step for analyzing the one or more emergency trigger messages is further comprised of identifying the predetermined trigger word in the text message.

25. The method of claim 23, wherein the one or more emergency trigger messages comprise one or more verbal communications from the one or more remote computing devices, wherein the content of the one or more emergency trigger messages is comprised of a predetermined trigger word within the one or more verbal communications, and wherein the step for analyzing the one or more emergency trigger message using the emergency response module is comprised of the steps of converting the one or more verbal communications into a text message and identifying the predetermined trigger word in the text message.

26. The method of claim 23, wherein:

analyzing the one or more emergency trigger messages comprises:

analyzing the one or more emergency trigger messages to determine if the one or more emergency trigger messages contain one or more predetermined trigger words.

27. The method of claim 26, wherein:

determining the level of response to the one or more emergency trigger messages comprises:

determining that the level of response is the second level response when a predetermined number of the one or more emergency trigger messages include the one or more predetermined trigger words.

28. The method of claim 27, wherein:

determining that the level of response is the second level response further comprises:

determining that the level of response is the second level response when the predetermined number of the one or more emergency trigger messages includes the one or more predetermined trigger words and when the one or more emergency trigger messages including the one or more predetermined trigger words were sent from places within a predetermined distance of each other.

29. The method of claim 27, wherein:
determining the level of response to the one or more emergency trigger messages comprises:
  determining that the level of response is the first level response when the predetermined number of the one or more emergency trigger messages does not include the one or more predetermined trigger words.

30. The method of claim 23, wherein:
using the emergency response module to process the one or more emergency trigger messages further comprises:
  requesting locations of one or more user computing devices when the level of response is the second level of response; and
  receiving the locations from at least a first portion of the one or more user computing devices when the level of response is the second level of response;
  the at least the portion of the one or more computing devices comprise the at least the first portion of the one or more user computing devices; and
  the one or more remote computing devices comprise the one or more user computing devices.

31. The method of claim 30, wherein:
using the emergency response module to process the one or more emergency trigger messages further comprises:
  determining an approximate location of the emergency; and
  determining which of the one or more user computing devices are within a first predetermined distance of the emergency;
using the emergency response module to send the first emergency alert message to the target group comprises:
  using the emergency response module to send the first emergency alert message to a second portion of the one or more user computing devices that are within the first predetermined distance of the emergency; and
  the target group comprises the second portion of the one or more user computing devices that are within the first predetermined distance of the emergency.

32. The method of claim 23, further comprising:
determining in the emergency response module one or more appropriate emergency groups from a set of emergency groups and from which first response unit and the second response unit are determined, wherein the set of emergency groups is comprised of a police department, a fire department, and an emergency medical service, wherein each one of the emergency groups comprises a plurality of emergency response units, wherein at least one of the emergency groups includes the first response unit and the second response unit, wherein the emergency response module selects the one or more appropriate emergency groups from the set of emergency groups according to the set of trigger words in the trigger messages.

33. A method of responding to an emergency using a plurality of mobile electrical devices in operative communication with an emergency response computer system, each one of the mobile electrical devices comprising a processor and an emergency module, and the emergency response computer system comprising a processing unit, the method comprising:

setting a mass event trigger limit, wherein the mass event trigger limit is comprised of a defined number of emergency trigger messages received with a defined set of trigger words in a predefined time period from a set of locations within a defined distance from each other;
receiving in the emergency response computer system a set of response unit locations corresponding with a set of emergency response units and a set of emergency trigger messages from a plurality of users with a plurality of mobile electrical devices, wherein the set of emergency trigger messages is comprised of a first emergency trigger message from a first user of a first mobile electrical device, wherein the first emergency trigger message comprises a first trigger word, wherein the set of emergency trigger messages is further comprised of a second emergency trigger message from a second user of a second mobile electrical device, and wherein the second emergency trigger message comprises a second trigger word;
determining in the processing unit of the emergency response computer system whether a potential for a triggering mass event may have occurred by analyzing the first emergency trigger message and the second emergency trigger message, wherein the determining step confirms the potential for the triggering mass event according to the steps of determining the first trigger word and the second trigger word correspond to a related emergency situation and determining the first emergency trigger message and the second emergency trigger message had been received by the emergency response computer system within the predetermined time period;
receiving location information at the emergency response computer system from the emergency module of the first mobile electrical device and the second mobile electrical device, wherein the location information is a comprised of a set of locations corresponding to the set of emergency trigger messages respectively corresponding to the first mobile electrical device and the second mobile electrical device, and wherein the set of locations is comprised of a first location and a second location respectively corresponding to the first mobile electrical device and the second mobile electrical device;
determining in the processing unit of the emergency response computer system an occurrence of the triggering mass event when the potential for the triggering mass event has been confirmed by the related emergency situation and the predetermined time period and the location information indicates that the second mobile electrical device is within a predetermined distance from the first mobile electrical device;
sending to the emergency module of the first mobile electrical device and the second mobile electrical device a mass emergency message from the emergency response computer system based on the occurrence of the triggering mass event;
elevating in the processing unit of the emergency response computer system an emergency level from a first level to a second level based on the occurrence of the triggering mass event;
determining in the processing unit of the emergency response computer system a first response unit and a second response unit from the set of emergency response units when the emergency level is elevated from the first level to the second level, wherein the first response unit and the second response unit respectively have a first response unit location and a second response unit location within the set of response unit locations, and wherein the first response unit and the second response unit are determined according to a respective proximity of the first response unit location and the second response unit location to the first location of the first mobile electrical device and the second location of the second mobile electrical device;

transmitting the first location corresponding with the first mobile electrical device and the related emergency situation associated with the first emergency trigger message to the first response unit; and transmitting the second location corresponding with the second mobile electrical device and the related emergency situation associated with the second emergency trigger message to the second response unit.

34. The method of claim 33, wherein the first emergency trigger message and the second emergency trigger message each comprise at least one of a predetermined trigger word, a typed-word message, and a voice-recorded message, wherein the step for determining the first response unit and the second response unit from the set of emergency response units is further comprised of determining from a set of emergency groups an appropriate emergency group that is associated with the set of emergency response units according to the set of trigger words in the set of emergency trigger messages, wherein the set of emergency groups is comprised of a police department, a fire department, and an emergency medical service, and wherein the step for determining the potential for the triggering mass event is further comprised of at least one of the steps of identifying the first trigger word and the second trigger word as the predetermined trigger word, transcribing in the processing unit the voice-recorded message into a text message, and finding the first trigger word and the second trigger word in at least one of the text message and the typed-word message.

35. The method of claim 33, further comprising the steps:
creating a set of predetermined trigger words;
providing the emergency module of first mobile electrical device and the second mobile electrical device with the set of predetermined trigger words, wherein the first mobile electrical device is further comprised of a storage device, a touchscreen display, and a mobile phone;
storing the emergency module with the set of predetermined trigger words on the storage device:
operating the emergency module on the processor;
showing at least a subset of the set of predetermined trigger words on the touchscreen display;
producing with the processor the first trigger message with a particular one of the predetermined trigger words that the first user selects with the touchscreen display;
producing with the processor the second trigger message with the particular one of the predetermined trigger words that the second user selects with the touchscreen display; and
communicating the location information to the emergency response computer system using the emergency module of the first mobile electrical device and the second mobile electrical device.

36. The method of claim 33 further comprising the steps:
using the emergency module to monitor outgoing telephone calls from the first mobile electrical device to determine whether outgoing telephone calls have been made to an emergency telephone number; and if an emergency telephone call has been made to the emergency telephone number, communicating to the emergency response computer system a notification of the emergency telephone call using the emergency module;
using the processing unit of the emergency response computer system to find a voice-recorded message corresponding with the notification of the emergency telephone call; and
transcribing in the processing unit the voice-recorded message into a text message; and
finding the first trigger word the text message.

37. An emergency messaging system configured to be used with three or more first electrical devices, the emergency messaging system comprising:
a device communications module configured to run on at least one first processor and further configured to communicate with two or more sending electrical devices, the device communications module further configured to receive two or more emergency trigger messages from one or more users via the two or more sending electrical devices;
a processing module configured to run on the at least one first processor and further configured to process the two or more emergency trigger messages to determine an emergency level, the processing module comprises:
a location module configured to determine a first location of at least a first portion of the two or more sending electrical devices; and
an analyzing module configured to analyze the two or more emergency trigger messages to determine a content of the two or more emergency trigger messages, wherein the content comprises a set of trigger words corresponding to a set of emergency situations, wherein the set of emergency situations includes a first emergency situation and at least a second emergency situation;
a response module configured to run on the at least one first processor and further configured to determine a level of response to the two or more emergency trigger messages based upon the first location of at least the first portion of the two or more sending electrical devices and the content of the two or more emergency trigger messages, the levels of response comprise a first level response and a second level response;
a determination module configured to run on the at least one first processor and further configured to use a second location of at least a second portion of the two or more sending electrical devices to determine an appropriate first response unit to notify, and an appropriate second response unit to notify, wherein the appropriate first response unit has a first response unit location, wherein the appropriate second response unit has a second response unit location, and wherein the determination module determines the appropriate first response unit and the appropriate second response unit respectively corresponding with the first location and the second location according to a respective proximity of the first response unit location and the second response unit location to the first location and the second location; and
a notification module configured to run on the at least one first processor and further configured to notify the appropriate first response unit and the appropriate second response unit;
wherein a mass event trigger limit is set in the processing module, wherein the mass event trigger limit is comprised of a defined number of emergency trigger messages received with a defined set of trigger words in a defined period of time from a set of locations for the sending devices within a defined distance from each other;

wherein the determination module analyzes the emergency trigger messages relative to each other to confirm that the mass event trigger limit has been reached and initiates a mass event warning when the mass event trigger limit has been reached;

wherein the determination module determines a relationship between a subset of the set of emergency situations, wherein the relationship between the subset of emergency situations is comprised of a correlation between the trigger words for a subset of the set of emergency trigger messages received within a predetermined time period from a subset of the set of locations within a predetermined distance from the first location;

wherein the response module elevates the emergency level from the first level to the second level when the relationship between the subset of the set of emergency situations is determined to exist; and wherein the notification module transmits the first location of at least the first portion of the two or more sending electrical devices to the appropriate first response unit and transmits the second location of at least the second portion of the two or more sending electrical devices to the appropriate second response unit when the emergency level is elevated from the first level to the second level.

38. The emergency messaging system of claim 37, further comprising:

a user control module configured to run on a second processor, wherein the user control module is comprised of a touchscreen, wherein a set of emergency message buttons are displayed on the touchscreen, wherein a set of predetermined trigger words are respectively associated with the set of emergency message buttons, and wherein a selection of one of the emergency message buttons corresponds with one of the predetermined trigger words; and an emergency sending module configured to run on a second processor and further configured to send a first one of the two or more emergency trigger messages and the first location information to the device communications module, wherein the emergency sending module creates the first one of the two or more emergency trigger messages with the corresponding one of the predetermined trigger words, and wherein: a first one of the two or more sending electrical devices comprise the user control module, the emergency sending module, and the at least one second processor.

39. The emergency messaging system of claim 38, further comprising:

a location determination module configured to run on the at least one second processor and further configured to determine the location information of the first one of the two or more sending electrical devices and communicate the location information to the emergency sending module, wherein the set of emergency message buttons on the touchscreen of the user control module have a set of icons corresponding with police, fire, and ambulance, and wherein the predetermined trigger words are a set of terms respectively corresponding with police, fire, and ambulance.

40. The emergency messaging system of claim 38, further comprising:

a monitoring system configured to run on the at least one second processor and further configured to monitoring outgoing telephone calls from the first one of the two or more sending electrical devices to determine whether outgoing telephone calls have been made to an emergency telephone number.

41. The emergency messaging system of claim 37, wherein:

the device communications module is further configured to receive text messages from the two or more sending electrical devices, wherein the notification module provides an emergency system operator with the location, the emergency level, the appropriate first response unit, and the appropriate second response unit while notifying the appropriate first response unit and the appropriate second response unit, wherein the emergency system operator is in operative communication with the notification module.

42. The emergency messaging system of claim 37, wherein:

the analyzing module is configured to analyze the two or more emergency trigger messages to determine if the two or more emergency trigger messages contain one or more predetermined trigger words, wherein the determination module is configured to determine from a set of emergency groups one or more appropriate emergency groups according to the set of trigger words in the emergency trigger messages and from which the appropriate first response unit and the appropriate second response unit are determined, and wherein the set of emergency groups is comprised of a police department, a fire department, and an emergency medical service.

43. A method for emergency messaging to a target group using an emergency response computer system, the target group comprises two or more users, the method comprising:

receiving from each of the two or more users information regarding a portable communication device respectively used by each of the two or more users;

storing in one or more databases in the emergency response computer system a profile for each of the portable communication devices respectively associated with each of the two or more users;

selecting a first geographic area for emergency messaging using a mapping module in the emergency response computer system;

receiving current location information and an emergency trigger message in a communications module in the emergency response computer system from the portable communication device respectively used by at least a first user of the two or more users;

processing in a processing module of the emergency response computer system the emergency trigger message and the current location information to respectively determine a first emergency situation and identify a set of affected devices, wherein the current location information is a first location within the first geographic area, and wherein the set of affected devices comprise the portable communication devices of the two or more users that are within the first geographic area;

determining an appropriate emergency message corresponding with the first emergency situation;

transmitting the emergency message through the communications module to the set of affected devices to alert corresponding users of the set of affected devices to the first emergency situation in the first geographic area;

determining in the processing module an appropriate emergency group from a set of emergency groups, wherein the set of emergency groups is comprised of a police department, a fire department, and an emergency medical service, wherein each one of the emergency groups comprises a plurality of emergency response units, and wherein the processing unit selects the appropriate emergency group from the set of emergency groups according to the first emergency situation, wherein the step of processing the emergency trigger message further comprises analyzing a trigger word in the emergency trigger message;

determining in the processing module a first response unit from the plurality of emergency response units in the appropriate emergency group selected by the processor, wherein the first response unit has a second location within the set of response unit locations, wherein the processor selects the first response unit according to its relationship within the appropriate emergency group and a proximity of the second location to the first location of the portable communication device used by the first user;

transmitting from the communications module to the first response unit the first location of the portable communication device used by the first user and the first emergency situation associated with the emergency trigger message;

setting a mass event trigger limit, wherein the mass event trigger limit is comprised of a defined number of emergency trigger messages received with a defined set of trigger words in a defined period of time from a set of locations within a defined distance from each other;

analyzing in the processing module a plurality of emergency trigger messages relative to each other to confirm that the mass event trigger limit has been reached;

initiating a mass event warning in the processing module when the mass event trigger limit has been reached;

receiving a set of locations and a corresponding set of emergency trigger messages in the communications module from a set of the portable communication devices respectively used by a corresponding set of the two or more users;

analyzing the set of emergency trigger messages in the processing module for a set of trigger words corresponding to a set of emergency situations, wherein the set of emergency situations includes the first emergency situation and at least a second emergency situation;

determining a relationship between a subset of the set of emergency situations in the processing module, wherein the relationship between the subset of emergency situations is comprised of a correlation between the trigger words for a subset of the set of trigger messages received in the communications module within a predetermined time period from a subset of the set of locations within at least one of a predetermined distance from the first location and the first geographic area;

elevating an emergency level from a first level to a second level when the relationship between the subset of the set of emergency situations is determined to exist;

determining in the processing module a second response unit from the plurality of emergency response units in the appropriate emergency group selected by the processing module when the emergency level is elevated from the first level to the second level;

transmitting from the communications module to the first response unit and the second response unit the first location corresponding with the portable communication device and the first emergency situation associated with the first trigger message when the emergency level is elevated from the first level to the second level.

44. The method of claim 43, further comprising:

receiving in the mapping module a set of response unit locations corresponding with the emergency response units in each one of the emergency groups.

45. The method of claim 43, further comprising the steps:

transmitting from the communications module to the first response unit information regarding the second response unit.

* * * * *